United States Patent Office 3,501,465
Patented Mar. 17, 1970

3,501,465
3-INDOLYL LOWER ALIPHATIC AMINES
Tsung-Ying Shen, Westfield, and Lewis H. Sarett, Princeton, N.J., assignors to Merck & Co., Inc., Rahway, N.J., a corporation of New Jersey
No Drawing. Continuation of application Ser. No. 380,020, July 2, 1964. This application Nov. 29, 1967, Ser. No. 687,911
Int. Cl. C07d 27/56
U.S. Cl. 260—240                    8 Claims

ABSTRACT OF THE DISCLOSURE

The invention concerns 3-indolyl lower aliphatic amines having an aroyl or heteroaroyl radical of less than three fused rings attached to the nitrogen atom of the indole nucleus. Also covered are novel intermediates for the preparation of the above compounds. These intermediates are the 3-indolyl nitro aliphatic compounds and 3-indolyl alkylimines having an aroyl or heteroaroyl radical of less than 3 fused rings attached to the nitrogen atom of the indole nucleus.

---

This application is a continuation of our co-opending application Serial No. 380,020 filed July 2, 1964, now abandoned.

This invention relates to new chemical compounds. More specifically, it relates to a new class of compounds of the indole series. Still more specifically, it is concerned with new 3-indolyl lower aliphatic amines having an aromatic carboxylic acyl (aroyl or heteroaroyl) radical of less than three fused rings attached to the nitrogen atom of the indole nucleus. The invention is also concerned with the acid salts of these novel amines, to novel intermediates for the preparation thereof, and to the synthesis of all these compounds.

The new aroyl and heteroaroyl indolyl aliphatic amines of this invention have the general structural formula:

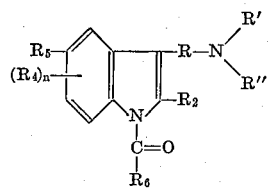

wherein:
R is selected from the group consisting of:

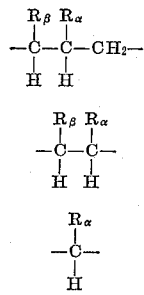

$R_\alpha$ and $R_\beta$ are selected from the group consisting of hydrogen, lower alkyl, halo lower alkyl, benzyloxy lower alkyl, hydroxy lower alkyl, lower alkenyl, phenyl, and lower alkynyl, and when taken together, methylene;

R′ and R″ are selected from the group consisting of hydrogen, lower alkyl, halo lower alkyl, lower alkoxy lower alkyl, ar-lower alkoxy lower alkyl, hydroxy lower alkyl, lower alkenyl, lower alkynyl, cyclopropylmethyl, cyclobutylmethyl, tetrahydrofurfuryl, cyclohexyl, and when R′ and R″ are taken together, form together with the nitrogen, piperidino, 1,2,5,6-tetrahydropyridino, morpholino, N-methylpiperazino, piperazino, N-phenylpiperazino, pyrrolidino, and N-hydroxyethylpiperazino rings;

$R_2$ is selected from the group consisting of hydrogen, lower alkenyl, p-lower alkoxyphenyl and lower alkyl;

$R_4$ and $R_5$ are selected from the group consisting of hydrogen, hydroxy, lower alkyl, lower alkoxy, nitro, amino, lower alkylamino, di(lower alkyl)amino, lower alkanoylamino, lower alkanoyl, bis(hydroxy lower alkyl) amino, 1-pyrrolidino, 4-methyl-1-piperazinyl, 4-morpholinyl, cyano, trifluoromethyl, halogen, di(lower alkyl) sulfamyl, benzylthio, benzyloxy, lower alkylbenzyloxy, lower alkoxybenzyloxy, halogenobenzyloxy, lower alkenyl, lower alkenyloxy, 1-azacyclopropyl, cyclopropyl lower alkoxy, cyclobutyl lower alkoxy, and when $R_4$ and $R_5$ are ortho to each other and taken together, lower alkylenedioxy;

$R_6$ may be an aromatic radical of less than three fused rings of more than four and less than seven atoms to the ring, in which rings any hetero- atoms present are selected from the group consisting of oxygen, nitrogen, and sulfur, there being from zero to three such heteroatoms present in no more than one of said rings and in which aromatic radicals any substituents other than hydrogen are selected from the group consisting of halogen, lower alkyl, lower alkylthio, lower alkoxy, trifluoromethyl, phenoxy, lower alkylphenoxy, lower alkoxyphenoxy, halogenophenoxy, trifluoroacetyl, difluoroacetyl, di(lower alkyl)sulfamyl, lower alkanoyl, di(lower alkyl)carboxamido, cyano, carb-lower alkoxy, aldehydo, trifluoromethylthio, lower alkylsulfinyl, lower alkylsulfonyl, benzylthio, lower alkylbenzylthio, lower alkoxybenzylthio, halogenobenzylthio, mercapto, nitro, amino, di(lower alkyl)amino, lower alkylamino, lower alkanoylamino, hydroxy, lower alkanoyloxy, trifluoroacetoxy, difluoroacetoxy, benzyloxy, lower alkylbenzyloxy, lower alkoxybenzyloxy, and halogenobenzyloxy;

n is a number from 1 to 3; and their acid addition salts.

The preferred R groups in the compounds of this invention are

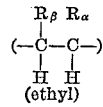
(ethyl)

and

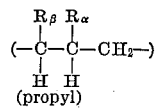
(propyl)

but especially the ethyl group. The preferred $R_2$ groups are lower alkyl (methyl, ethyl, butyl, and the like), hydrogen, and p-lower alkoxyphenyl (methoxyphenl, propoxyphenyl, and the like), but especially lower alkyl (methyl). The preferred groups on the $R_\alpha$ and $R_\beta$ positions are lower alkyl (methyl, ethyl, butyl, and the like), hydrogen, methylene (when $R_\alpha$ and $R_\beta$ are taken together), hydroxy (only for $R_\beta$), and lower alkoxy (methoxy, ethoxy, butoxy, and the like—only for $R_\beta$), but especially lower alkyl (methyl) or lower alkoxy (methoxy). The preferred groups on the R′ and R″ positions are hydrogen, lower alkyl (methyl, propyl, butyl, and the like), lower alkenyl, (allyl, vinyl, and the like), hydroxy lower alkyl (hydroxymethyl, hydroxypropyl, and the like), β-phenethyl acetyl and α-phenethyl (only one of R′ and R″ being β-phenethyl acetyl or α-phenethyl at any one time), but especially lower alkyl (methyl) and lower alkenyl (allyl). The preferred groups on the $R_4$ position are hydroxy, fluorine, lower alkoxy (methoxy, propoxy, butoxy, and the like), and lower alkenyl (allyl, vinyl, and the like). The preferred groups on the $R_5$ position are halogen (fluorine, chlorine or bromine), lower alkyl (methyl, ethyl, propyl, and the like), lower alkoxy (methoxy, ethoxy, propoxy, and the like), hydroxy, and lower alkenyl (allyl, vinyl, and the like), but especially hydroxy and lower alkenyl (allyl). When there is more than one substituent on the benzene ring, the preferred groups are 5,6-methylenedioxy, 5,6-dilower alkoxy (dimethoxy, diethoxy, and the like), 4,5,6-trilower alkyl (trimethyl, and the like), 5,6-dichloro, and 4,5,6-tribenzyloxy, but especially 5,6-methylenedioxy and 5,6-dilower alkoxy. The preferred groups on the $R_6$ position are substituted phenyl groups wherein the phenyl is substituted with o-, m-, or p-halo, lower alkoxy (methoxy, propoxy, and the like) and lower alkylthio (methylthio, propylthio, butylthio, and the like); trifluoromethyl, b,p-dilower alkoxy (dimethoxy, diethoxy, dibutoxy, and the like), m,p-dilower alkoxy (dimethoxy, dipropoxy, dibutoxy, and the like), o,m,-methylenedioxy, m,p-methylenedioxy, and 3,4,5-trilower alkoxy (trimethoxy, tripropoxy, tributoxy, and the like), but especially lower alkylthio (methylthio), lower alkoxy (methoxy), o,p-dilower alkoxy (dimethoxy), m,p-methylenedioxy, and 3,4,5-trilower alkoxy (trimethoxy).

We have found that when a 3-indolyl lower aliphatic amine is substituted in the N-1 position by an aroyl or hetero-aroyl group such as p-chlorobenzoyl or 2-thenoyl rather than by a lower alkyl group, the N-1 acyl compounds produced possess anti-inflammatory activity, also exhibit anti-pyretic action, indicate value as anti-serotonin, analgesic, antidepressant, and psychic-stimulating agents and are also of value in the treatment of arthritic, dermatological disorders, and other like conditions which are responsive to treatment with anti-inflammatory agents.

For these purposes, the compounds of this invention are normally administered orally in tablets or capsules, the optimum dosage depending, of course, on the particular compound being used and the type and severity of infection being treated. Although the optimum quantities of these compounds of this invention to be used in such a manner will depend on the compound employed and the particular type of disease condition treated, oral dose levels of preferred compounds in the range of 1.0–2,000 mg. per day are useful in control of arthritic conditions, depending on the activity of the specific compound and the reaction sensitivity of the patient.

It is an advantage of our invention that substitution at the N-1 position with an aroyl or hetero-aroyl group in a 3-indolyl lower aliphatic amine compound imparts anti-inflammatory activity to the previously non-active compound.

The compounds of this invention also absorb ultraviolet light and are generally useful as sun-screening materials in salves and ointments. In addition, because of their high solubility in organic materials generally, they may be used as ultraviolet absorbers in plastics and resins, such as polystyrene, polyethylene, polypropylene, polyacrylics (methacrylate resins, polyacrylamides, polyacrylonitrile fibers), polyamide fibers (e.g., nylon), and polyester fibers. In this use, the inclusion of 0.01 to 5% of the absorber, based on the polymer weight, is sufficient to render protection against instability due to ultraviolet light. The absorber may be incorporated in the mixture of monomers before polymerization to form the polymer or it may be incorporated in the polymer at any stage during its handling, as by milling into the polymer together with other compounding ingredients or during the spinning of polymers into fibers, etc.

The basic indole structure for all the compounds of this invention, namely:

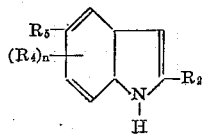

is readily prepared following known procedures such as those set forth in columns 2 and 3 of U.S. Patent No. 2,825,734. Products where $R_5$ is acyloxy, halo, cyano, carboxy, carbalkoxy, N,N-dilower alkyl carbamyl, alkyl, aryl, aralkyl, nitro, or hydrocarbonoxy are prepared via the synthesis beginning from a substituted 2-nitro-benzaldehyde or 2-nitro-toluene.

The synthesis of various compounds of this invention having on the indole ring system an $R_4$ or $R_5$-substituent which has a nitrogen attached to the homocyclic ring of the indole is generally based on the 4 or 5-nitro compound. This is transformed into the desired $R_4$ or $R_5$-substituent. Such transformation may be before or after acylation of the 1-position, depending on the extent to which the desired 4 or 5-substituent may interfere with the acylation. If such interference is possible, the 1-acylation should be carried out on the 4 or 5-nitro indole and the nitro later transformed into the desired 4 or 5-substituent. Such transformation can be carried out in a number of ways. Reduction of the 4 or 5-nitro groups gives a 4 or 5-amino group. Reaction of the amino with alkyl halides gives mono or dialkylamino groups. If the alkyl halide is a dihaloalkylene group (e.g., 1,4-dibromobutane), a heterocyclic ring (e.g., pyrrolidino) is formed. Similarly, bis ($\beta$-chloroethyl)ether will give an N-morpholino compound. Alkylation can also be carried out simultaneous with reduction, as, e.g., with formaldehyde and Raney nickel and hydrogen. Acylation can similarly be carried out on the 4 or 5-amino compounds or on the 4 or 5-nitro (with simultaneous reduction) to give 4 or 5-acylamido compounds. The 4 or 5-amido group can be reacted with isocyanates to give 4 or 5-ureido compounds. Free mercapto groups likewise will interfere with the acylation and should be formed after such a step or protected by conversion to an alkyl or aralkylthio group.

The prepartion of the starting materials for this invention differs depending on to which of three separate classes of indole compounds, namely, (1) methylamines, (2) ethylamines, and (3) propylamines, the final products will belong. It will be noted (Flow Sheets I, III, and V) that regardless of which class of starting material is prepared, N-1 acylation and/or reduction is required. Under these circumstances for further clarity, a general discussion of the acylation and reduction steps is first given, which will apply to all classes of starting materials, followed by discussions, which, for the most part, pertain to each specific class at hand.

In those cases wherein the starting material contains the N-1-acyl group (such as Compounds II, III, V, VI, VII, VIII, X, and XI), the substituents on the indole ring and $R_\alpha$ and/or $R_\beta$ which are susceptible to acylation (compounds containing active hydrogen, such as $NH_2$ and COOH) either must be eliminated or protected prior to acylation. In those cases wherein the indole substituent contains an amino group, the corresponding nitro group is used, and after acylation, the compound is reduced to the primary amine and subsequently treated to obtain the required substituted amino group. In those cases wherein the indole substituent contains the hydroxyl or carboxyl group, these groups may be protected prior to acylation by forming the benzyloxy substituent, which in turn, after acylation, may be reduced to the corresponding hydroxy or carboxy group.

In those cases wherein a reduction is required to prepare the starting materials, Compounds I (prepared through the imine), IV, and IX and all those groups in the molecule which are susceptible to reduction (such as alkenyls, alkynyls, benzyloxy, nitro, and cyano groups) are either eliminated or protected prior to the reduction step. In those cases where the substituent is an alkenyl or alkynyl group, the corresponding aldehyde or ketone may be used, whereupon, after reduction, the aldehyde or ketone is converted to the alkenyl or alkynyl group by means of a Wittig reaction. In those cases where the group is a benzyloxy or substituted benzyloxy, the corresponding hydroxy or substituted hydroxy may be used, whereupon, after reduction, the benzyloxy substituent may be obtained by benzylating the hydroxy group. In cases wherein the substitution is the cyano group, the carboxamide group is used in its place, whereupon, after reduction, the carboxamide is dehydrated to the desired cyano substituent. In some cases, it is also possible to reduce the particular compound by a selective reduction, which will not affect certain groups. Some of these reducing techniques are herein described with reference to the various starting materials of our invention:

When R' and/or R" substituents are desired other than hydrogen (as, e.g., in Compounds I, IV, and IX), the primary amino group of these compounds is reacted with the proper organic halide to yield the desired R' and/or R" substituent, as, e.g., when a lower alkyl is desired, the primary amino group may be reacted with a lower alkyl iodide in an inert solvent at slightly elevated temperatures; when an allyl group is desired, the primary an allylamino group may be reacted with an allyl bromide; or when R' and R" are taken together with the nitrogen and the morpholino group is desired, the reaction may be carried out on the primary amino group using β,β-dichlorodiethyl ether.

(A) PREPARATION OF METHYLAMINE STARTING MATERIALS

The starting materials used for the preparation of the methylamine compounds (Flow Sheet I) of this invention may be described as: N-1-unsubstituted-3-indolyl-methylamines (Compound I); N-1-acyl-indoles (Compound II); and N-1-acyl-3-indolylmethylimines (Compound III).

N-1-unsubstituted-3-indolylmethylamines

This compound may be prepared by a Mannich reaction between the corresponding indole, formaldehyde, and a secondary amine, or an N-unsubstituted cyclic amine, usually as the hydrochloride (Step 1). When a primary amine is desired on the side chain, dibenzylamine is used in the above reaction, and when a secondary amine is desired on the side chain, a benzylalkylamine is used. In either case, the primary or secondary amine is subsequently obtained by reducing the benzylamine group at any stage of the synthesis, by any known means. Compound I with an $R_a$ substituent other than hydrogen may be prepared by reducing the imine (Step (6)) obtained from Step (4) and subsequent reaction of the primary amine thus obtained to provide the desired R' and R" substituents.

N-1-acyl-indoles

This compound may be prepared by acylating the corresponding indole with an anhydride or halide of an aroic acid or hetero-aroic acid or an ester of o- and/or p-nitrophenol and an aroic or hetero-aroic acid, in the presence of a strongly basic condensing agent, such as NaH, in an inert solvent at ambient temperatures (Step (2)).

N-1-acyl-3-indolylmethylimines

This compound may be obtained by first preparing the 3-indolyl aldehyde by reactinng the corresponding indole with phosphorous oxychloride and dimethylformamide or ethylmagnesium bromide and ethyl formate (where $R_a$ is to be hydrogen) or using ethylmagnesium iodide and an acid chloride (RCOCl) when $R_a$ is to be other than hydrogen (Step (3)). The 3-indolyl aldehyde or ketone is then reacted with a primary amine to form an N-1-unsubstituted-3-indolylimine (Step (4)). This imine is then acylated as in the preparation of Compound II.

FLOW SHEET I
Preparation of methylamine starting materials

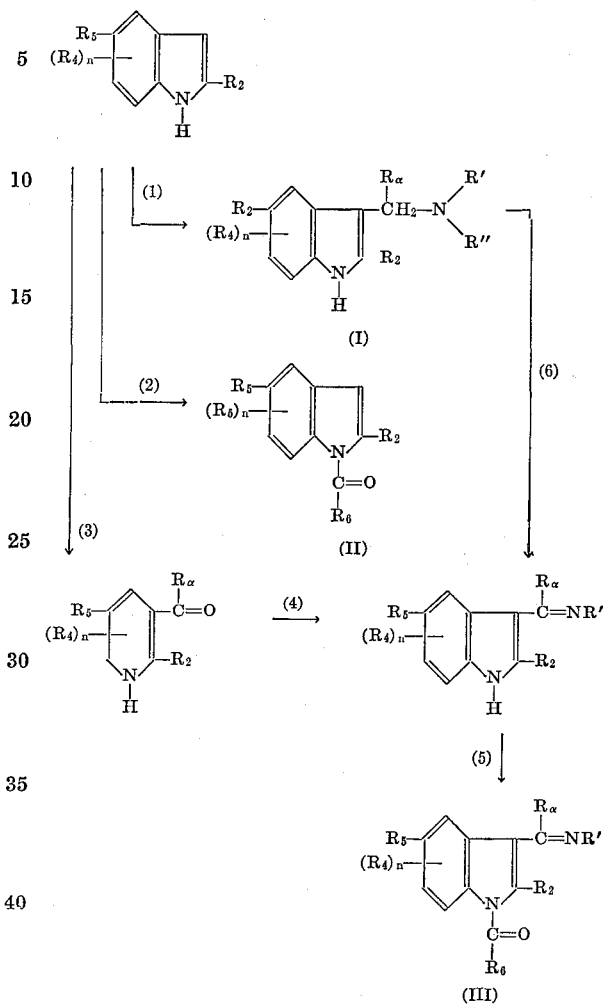

*Equivalents.*—The various substituents are as previously defined.

Reactions and conditions

*Step (1)*.—Reaction with formaldehyde and dibenzylamine, benzylalkylamine or a secondary amine of the formula

in an inert solvent, such as ethanol (Mannich reaction). (In this case $R_a$=hydrogen). When dibenzylamine or benzylalkylamine is used, the product thus obtained after the Mannich reaction is reduced by any known means (such as palladium on charcoal).

*Step (2)*.—Reaction at room temperature with an anhydride or chloride of an aroic acid or hetero-aroic acid of o- and/or p-nitrophenyl ester of an aoric or hetero-aroic acid in the presence as NaH in an inert solvent, such as dimethylformamide.

*Step (3)*.—Reaction with chloroform and alkali (used when $R_a$ is H) or reaction with an aliphatic acid anhydride at elevated temperatures (used when $R_a$ is other than H) in an inert solvent or in the acid anhydride itself acting as the solvent.

*Step (4)*.—Reaction with the desired primary amine in an inert solvent or in the amine itself acting as solvent at room temperature.

*Step (5)*.—Same as Step (2).

*Step (6)*.—Reduction with palladium on alumina in an atmosphere of hydrogen in an inert solvent at room temperature.

The reduction of the imine in the preparation of Compound I may be carried out by a catalytic reduction, a sodium and alcohol reduction, or a zinc and acetic acid reduction. When a benzyloxy, alkenyl, alkynyl, cyclopropyl, or benzylthio group is desired in Compound I, the reduction step (Step (6)) may be carried out in the presence of sodium and alcohol, thereby not affecting the said groups. In those cases wherein it is desired to retain an aldehyde group, reduction may be carried out with zinc and acetic acid.

FLOW SHEET II

Preparation of methylamine compounds of this invention

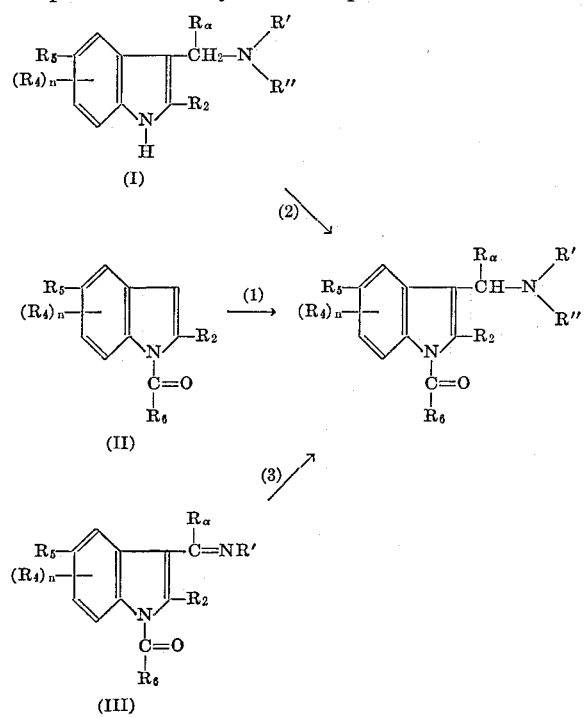

*Equivalents:* The various substituents are as previously defined.

Reactions and conditions

*Step (1).*—Reactions with formaldehyde and dibenzylamine, benzylalkylamine, a secondary amine, or N-unsubstituted cyclic amine at any suitable temperature and time, using the formaldehyde or amine as a solvent or an inert solvent such as acetic acid, alcohols, and the like. When dibenzylamine or benzylalkylamine is used, the reaction product is subsequently reduced, by known means (such as palladium on charcoal) to obtain the primary or secondary amine.

*Step (2).*—Reaction with a mixed anhydride of an aroic acid or hetero-aroic acid and a strong inorganic acid or a mixed anhydride of an aroic acid or hetero-aroic acid and an organic acid or ester of an aroic acid and o- and/or p-nitrophenol or a hetero-aroic acid and o- and/or p-nitrophenol (preferably an aroic acid anhydride or halide, especially p-methylthiobenzoyl chloride or p-chlorobenzoyl chloride) in a suitable solvent (such as dimethylformamide, benzene, toluene—dimethylformamide preferred) in the presence of a strongly basic condensing agent (such as sodium hydride and potassium hydride—sodium hydride preferred) at any effective combination of temperature and time (preferably room temperature for one hour).

*Step (3).*—Reduction by catalytic reduction, metal acid reduction, or diborane reduction followed by reaction of the amine thus formed with an organic halide when additional substituents are desired on the amine. (See col. 5, line 12 to line 24.)

Step (2) may be carried out under Mannich reaction conditions. The formaldehyde is generally used in the form of 20–40% aqueous solution. The reaction is preferably carried out in an alcoholic solvent (e.g., methanol, ethanol, and the like) containing a trace of a hydrohalic acid, although water, acetic acid, and mixtures of acetic acid and water may be conveniently employed. The reaction is usually carried out at temperatures between 10–50° C., preferably at ambient temperatures. The time of the reaction may be from 15 minutes to overnight, preferably longer than one hour. When a primary amine is desired, dibenzylamine is used. When an R' or R'' substituent is desired other than hydrogen, a benzylalkyl amine is used, and in those cases wherein both R' and R'' are to be other than hydrogen, a secondary amine or cyclic amine is used. Subsequently, the dibenzylamine or benzylalkylamine is reduced. It is to be observed that this procedure to prepare the methylamine compounds of our invention is used only when $R_a$ is to be hydrogen. In those cases wherein $R_a$ is to be other than hydrogen, the other indicated processes are to be used.

(B) PREPARATION OF ETHYLAMINE COMPOUNDS

The starting materials used for the preparation of the ethylamine compounds (Flow Sheet III) of this invention may be described as: N–1-unsubstituted-3-indolylethylamines (Compound IV); N–1-acyl-3-indolylnitroethenes (Compound V); N–1-acyl-3-indolylethylimines (Compound VI); and N–1-acyl-3-indolylacetonitriles (Compound XI).

N–1-unsubstituted-3-indolylethylamines and N–1-acyl-3-indolylnitroethenes

These compounds may be prepared by similar procedures. An N–1-unsubstituted-3-indolylnitroethene is first prepared (Steps (7) and (8)). These compounds may be prepared as indicated in column 5, line 4, of U.S. Patent No. 3,072,530. The procedure in the patent describes the preparation of a straight chain nitroethene compound. However, by a slight modification of reactants, the nitroethene compounds for the instant application can be prepared. For example, in those cases wherein an $R_\beta$ other than hydrogen is desired, the corresponding indolyl ketone rather than the indolyl aldehyde is used, and when an $R_a$ other than hydrogen is desired, the corresponding nitroalkane is used. After preparing the N–1-unsubstituted-3-indolylnitroethene as described above, Compound IV is prepared by reducing the said N–1-unsubstituted-3-indolylnitroethene, and, if desired, subsesuent reaction of the primary amine thus obtained to provide the desired R' and R'' substituents. Compound V is prepared by acylating the said N–1-unsubstituted-3-indolylnitroethene (as described in the prepartion of Compound II).

N–1-acyl-3-indolylethylimines

This compound may be obtained by first preparing the indolyl acid corresponding to the final indolyl amine compound desired. This acid may be prepared by following the procedure set forth in Belgian Patent No. 615,395. The indolyl acid is then reacted with $PCl_5$ to prepare the corresponding acid chloride (Step (11)), which is then reacted with an organic cadmium compound to produce the corresponding indolyl ketone (Step (12)). The indolyl imine (Compound VI) is then prepared by reaction with a primary amine (following the procedure in Belgian Patent No. 628,441), and subsequently acylating the N–1 position.

N–1-acyl-3-indolylacetonitriles

This compound may be prepared via the corresponding indole acetic acid. This may be accomplished by: (a) reaction of the N–1-unsubstituted indole acetic acid with triethylamine and isobutyl chloroformate followed by the addition of ammonia to produce the N–1-unsubstituted-3- indolylamide (Step (25)); (b) acylating the indole amide thus formed (Step (26)); and (c) reaction of this N–1-acyl amide with thionyl chloride in pyridine (Step (27)).

FLOW SHEET III

Preparation of ethylamine starting materials (2) Ethylamines

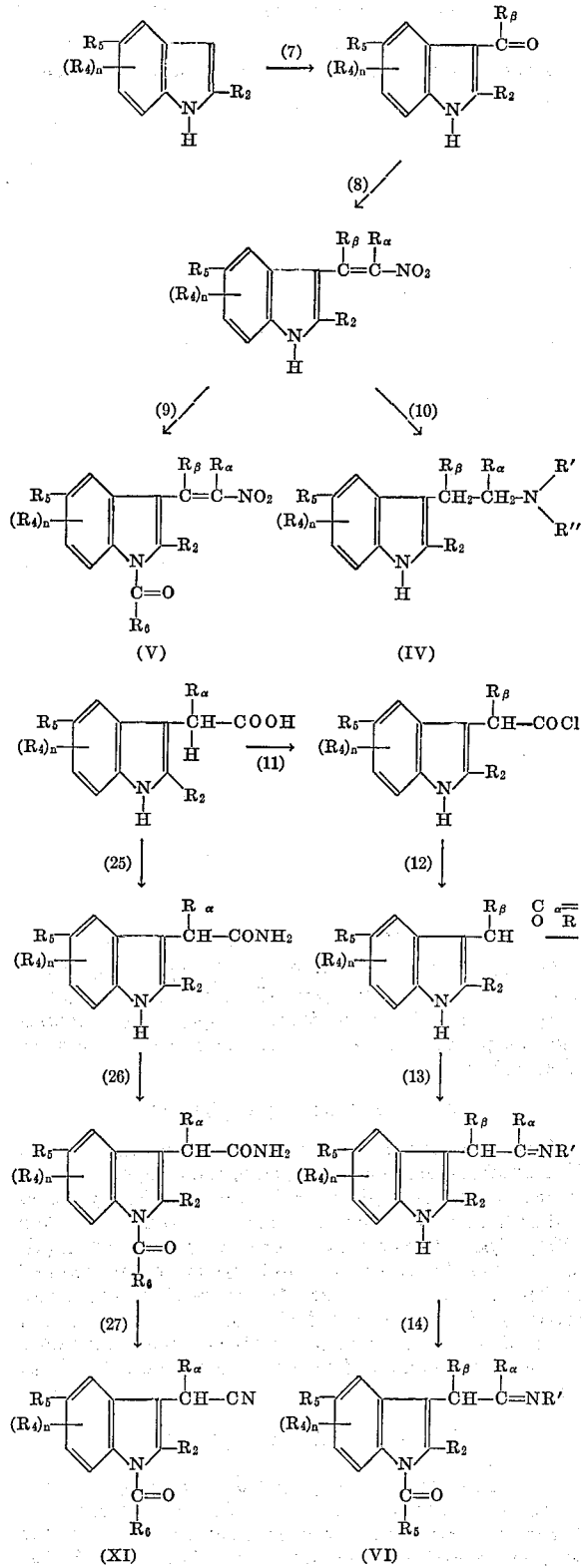

Equivalents: The substituents are as previously defined.

Reactions and conditions

*Step (7)*.—Same as Step (3), Flow Sheet I.

*Step (8)*.—Reaction with the appropriate nitroalkane compound needed to obtain the desired $R_\alpha$. The reaction is carried out at elevated temperatures, usually using the nitroalkane as the solvent.

*Step (9)*.—Same as Step (2), Flow Sheet I.

*Step (10)*.—Reduction with lithium aluminum hydride. The reaction is usually carried out in an inert solvent, such as tetrahydrofuran, at slightly elevated temperatures. When R' and/or R'' other than hydrogen is desired, the primary amine thus obtained is reacted with the corresponding organic halide to obtain the desired substituent on the R' and/or R''.

*Step (11)*.—Reaction with phosphorus pentachloride at 0° C. in dry ether for approximately 3 hours.

*Step (12)*.—Reaction with a di-aliphatic cadmium compound in an inert solvent, such as benzene, at the reflux temperature of the solvent for 1–2 hours. (The di-aliphatic group of the cadmium compound corresponds to the desired $R_\alpha$.)

*Step (13)*.—Reaction with ammonia or with the desired primary amine in an inert solvent or in the amine itself acting as the solvent at room temperature.

*Step (14)*.—Same as Step (2), Flow Sheet I.

*Step (25)*.—Reaction in a suitable solvent at the temperature of the reaction mixture with a ½ ester of phosgene and a lower alkanol or a ½ ester of phosgene and an ar-lower alkanol to form an anhydride and subsequently adding ammonia.

*Step (26)*.—Same as Step (2), Flow Sheet I.

*Step (27)*.—Reaction with thionyl chloride in a suitable solvent at or below ambient temperatures.

In the preparation of Compound IV, three general reducing methods may be employed, namely, lithium aluminum hydride, metal acid, or a catalytic reduction. When it is desired to retain any alkenyl, alkynyl, cyclopropyl, and aldehyde groups in Compound IV, the reduction may be carried out with a metal acid. When it is desired to retain the benzylthio group, the reduction may be carried out directly with a metal hydride.

Compound VI is prepared from a corresponding N-1-unsubstituted-3-indolyl acetaldehyde compound (Flow Sheet III, Step (12)). This aldehyde compound is prepared from the corresponding acid by conversion through the acid chloride (Flow Sheet III, Steps (11) and (12)). The conversion of the acid to the acid chloride will affect such groups as hydroxy, carboxamido, carboxy, amino, aldehydo, and keto; therefore, these groups must be either protected or eliminated prior to the acid chloride preparation. Protection of such groups as hydroxy, amido, amino, and carboxyl may be obtained by benzylating these groups prior to the preparation of the acid chloride, and, if desired, subsequently reducing the compound to obtain the said hydroxy, amido, amino, or carboxyl group.

The acylation, Step (26), in the preparation of the N-1-acyl-3-indolylacetonitrile compound may be carried out upon the amide as indicated, or the nitrile, Step (27), may be prepared from the N-1-unsubstituted amide followed by acylation of the nitrile formed. It is apparent then that the acylation may be carried out at either the amide stage or nitrile stage in the preparation of Compound XI. Reaction step (25) may be run with a ½ ester of phosgene and a lower alkanol or ar-lower alkanol; such alcohols may be represented as ethanol, propanol, isobutanol, benzyl alcohol, and the like, isobutanol being preferred. Any inert solvent may be used which will dissolve the reactants; such suitable solvents are dimethoxyethane, dioxane, tetrahydrofuran, ethers, and the like, dimethoxyethane being preferred. The temperature of the reaction is maintained no higher than the temperature created by the reaction, but preferably the reaction is carried out at or below ambient temperatures. The time of the reaction is determined by the nature of the reactants and the solvents employed. Step (27) is carried out at or below ambient temperatures, the reaction not being allowed to be run much above ambient temperatures; in fact, ambient temperatures are preferred. Although other dehydrating agents may be used, thionyl chloride is the one of choice. Solvents that are inert to the reaction and which have basic characteristics such as pyridine may be used.

FLOW SHEET IV

Preparation of the ethylamine compounds of this invention

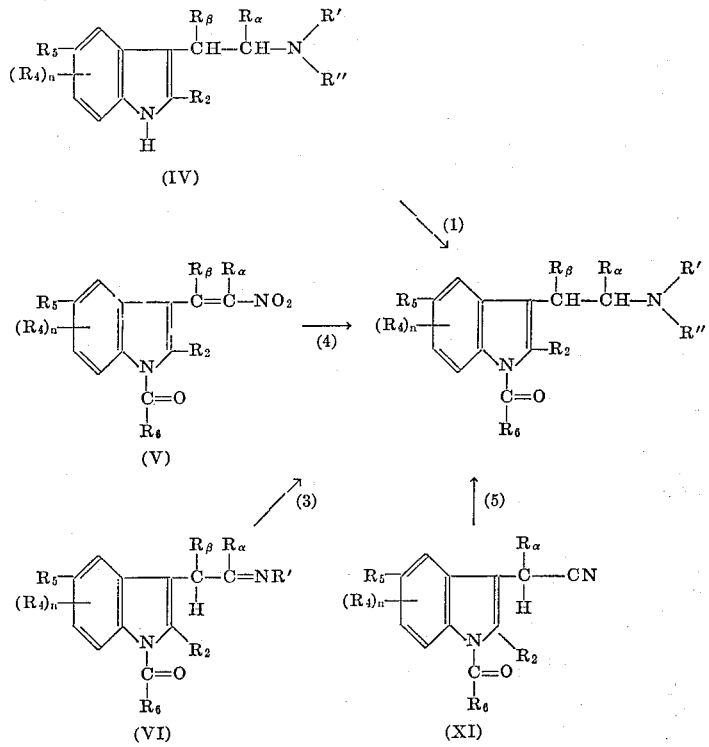

*Equivalents:* The substituents are as previously defined.

Reactions and conditions

Step (1).—Same as Step (1), Flow Sheet II.
Step (3).—Same as Step (3), Flow Sheet II.
Step (4).—Reduction by catalytic reduction or metal acid reduction followed by reaction of the primary amine thus formed with the appropriate aliphatic halide when a secondary or tertiary amine is desired.
Step (5).—Reduction by catalytic reduction, metal acid reduction, or diborane reduction followed by reaction of the primary amine thus formed with the appropriate aliphatic halide when a secondary or tertiary amine is desired.

(C) PREPARATION OF PROPYLAMINE STARTING MATERIALS

The starting materials used for the preparation of the propylamine compounds of this invention may be described as: N–1-acyl-3-indolylpropionitriles (Compound VII); N–1-acyl-3-indolylnitropropenes (Compound VIII); N–1-unsubstituted - 3 - indolylpropylamines (Compound IX); and N–1-acyl - 3 - indolylpropylimines (Compound X).

Compounds VII, IX, and X may be prapared via the corresponding N–1-unsubstituted - 3 - indolylpropionitrile compound (product of Step (17)). The N–1-unsubstituted-3-indolylpropionitrile compound is prepared by reducing the corresponding keto compound (prepared in accordance with the reactions of Steps (11) and (12)) to obtain the hydroxyethyl compound (Step 15)). The hydroxyethyl compound in turn is reacted with phosphorus bromide to yield the corresponding ethyl bromide compound (Step (16)), which in turn is treated with potassium cyanide to yield the above-mentioned N–1-unsubstituted - 3 - indolylpropionitrile compound (Steps (15), (16), and (17)).

N–1-acyl-3-indolylpropionitriles

This compound is prepared by acylating the said N–1-unsubstituted - 3 - indolylpropionitrile compound (Step (19)).

N–1-unsubstituted-3-indolylpropylamines

This compound is prepared by reducing the said N–1-unsubstituted-3-indolylpropionitrile compound to the primary amine and, when desired, appropriate reactions with the primary amine to obtain the substituted amines (Step (18)).

N–1-acyl-3-indolylpropylimines

This compound is then prepared by reducing the said N–1-unsubstituted-3-indolylpropionitrile compound to the corresponding aldehyde by reduction with Raney nickel and sodium hypophosphite in aqueous acetic acid (Step (20)). The aldehyde thus obtained is treated with a primary amine (in accordance with the procedure outlined in Belgian Patent No. 628,441) to produce the corresponding N–1-unsubstituted - 3 - indolylimine compound (Step (21)), which in turn is acylated (under conditions as previously mentioned to obtain Compound X) (Steps (20), (21), and (22)).

N–1-acyl-3-indolylnitropropenes

This compound may be prepared by reacting the corresponding N–1-unsubstituted - 3 - indolylethylketone (obtained from Step (12)) with nitromethane in accordance with the procedure described in U.S. Patent No. 3,072,-530, column 5, line 4, to obtain the N–1-unsubstituted-3-indolylnitropropene and subsequently acylating this compound (Steps (23) and (24)).

FLOW SHEET V

Preparation of propylamine starting materials

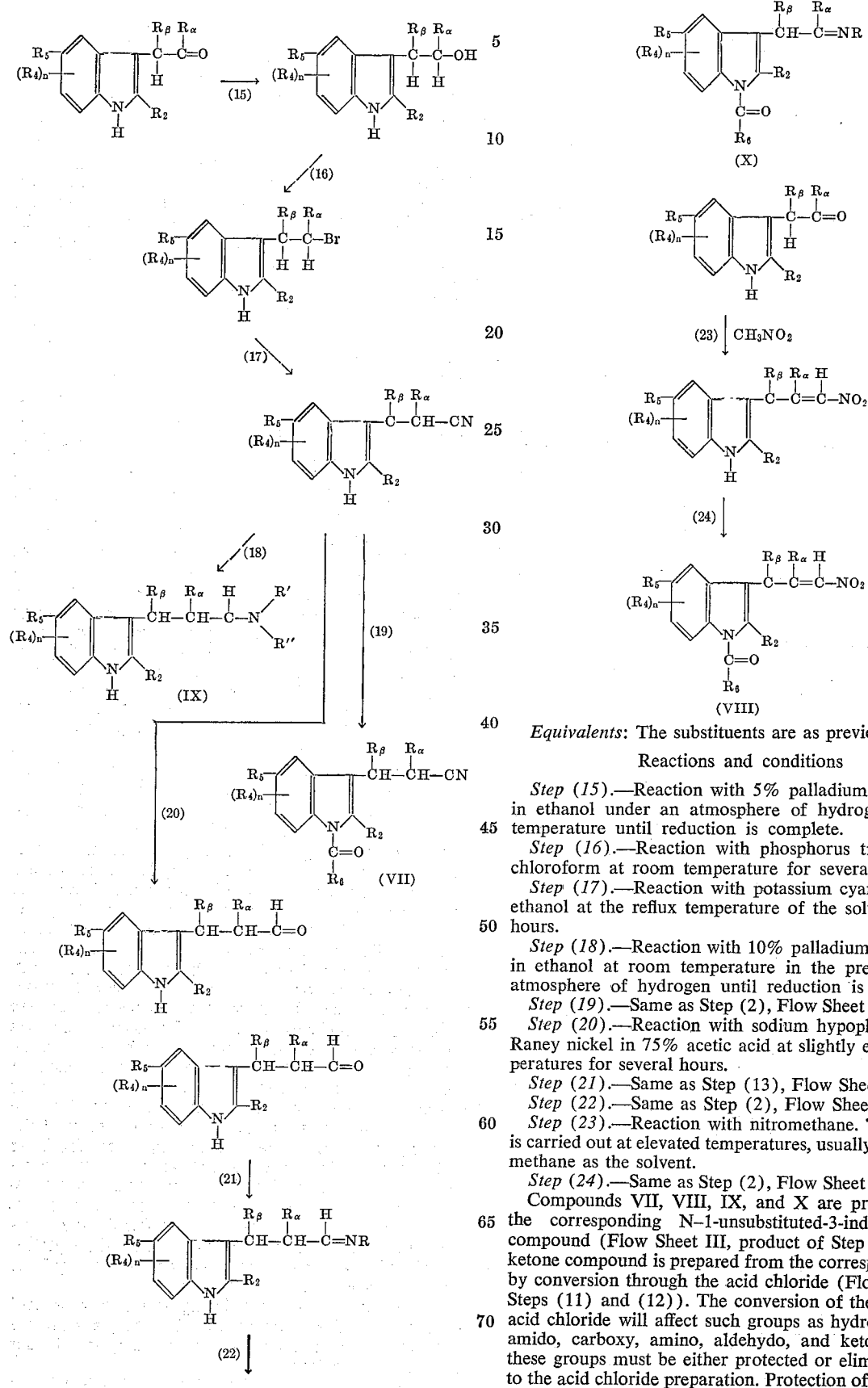

Equivalents: The substituents are as previously defined

Reactions and conditions

Step (15).—Reaction with 5% palladium on charcoal in ethanol under an atmosphere of hydrogen at room temperature until reduction is complete.

Step (16).—Reaction with phosphorus tribromide in chloroform at room temperature for several hours.

Step (17).—Reaction with potassium cyanide in 90% ethanol at the reflux temperature of the solvent for 1–3 hours.

Step (18).—Reaction with 10% palladium on charcoal in ethanol at room temperature in the presence of an atmosphere of hydrogen until reduction is complete.

Step (19).—Same as Step (2), Flow Sheet I.

Step (20).—Reaction with sodium hypophosphite and Raney nickel in 75% acetic acid at slightly elevated temperatures for several hours.

Step (21).—Same as Step (13), Flow Sheet III.

Step (22).—Same as Step (2), Flow Sheet I.

Step (23).—Reaction with nitromethane. The reaction is carried out at elevated temperatures, usually using nitromethane as the solvent.

Step (24).—Same as Step (2), Flow Sheet I.

Compounds VII, VIII, IX, and X are prepared from the corresponding N-1-unsubstituted-3-indolyl ketone compound (Flow Sheet III, product of Step (12)). This ketone compound is prepared from the corresponding acid by conversion through the acid chloride (Flow Sheet III, Steps (11) and (12)). The conversion of the acid to the acid chloride will affect such groups as hydroxy, carboxamido, carboxy, amino, aldehydo, and keto; therefore, these groups must be either protected or eliminated prior to the acid chloride preparation. Protection of such groups as hydroxy, amido, amino, and carboxyl may be obtained by benzylating these groups prior to the preparation of the acid chloride and, if desired, subsequently reducing the compound to obtain the said hydroxy, amido, amino, or carboxyl group.

The reduction of the nitrile in the preparation of Compound IX may be carried out using a catalytic reduction, a metal acid reduction, a sodium and alcohol reduction, a metal hydride reduction, or a diborane reduction; therefore, when it is desired to have a benzyloxy, alkenyl, alkynyl, cyclopropyl, and/or benzylthio group on Compound IX, the reduction may be carried out with sodium and alcohol and the said groups will not be affected. When the substituent on the compound is to be an aldehydo group, a metal acid reduction may be used. When it is desired to retain any nitro group which may be present, the nitrile reduction may be carried out with diborane.

As indicated, Compounds VII, IX, and X are prepared from a common propionitrile compound. This propionitrile compound may be prepared from the ketone indicated in Steps (15), (16), and (17). The reaction for the conversion of the corresponding alcohol to the bromide compound (Step (16)) (the precursor of the said propionitrile compound) will also affect any active hydrogen groups on the molecule. Therefore, when a hydroxy, amido, amino, or carboxyl group and the like is desired, it may be protected by benzylation prior to the PBr₃ reaction and subsequently reduced to obtain the said hydroxy, amido, amino, or carboxyl group.

FLOW SHEET VI

Preparation of the propylamine compounds of this invention

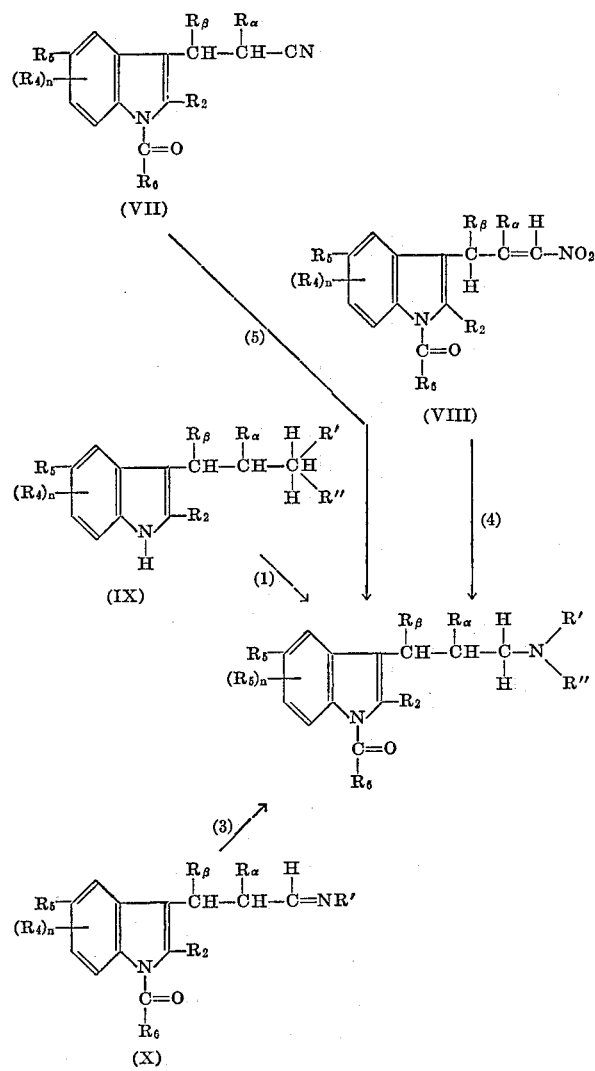

*Equivalents*: The substituents are as previously defined.

Reactions and conditions

Step (1).—Same as Step (1), Flow Sheet II.
Step (3).—Same as Step (3), Flow Sheet I.
Step (4).—Same as Step (4), Flow Sheet IV.
Step (5).—Same as Step (5), Flow Sheet IV.

In the preparation of the compounds of this invention, several of the processes involve acylation, reduction, and/or alkylation of an amine. Under these circumstances, because of various substituents on the indole ring, interference with the above-mentioned reactions may take place. When acylation is required, as, for example, the reactions of Compounds I, IV, and IX, a similar procedure is followed, as previously indicated, for the preparation of the N-1-acyl starting materials. In those cases where reduction is required to prepare the compounds of this invention, such as in the reaction of Compounds III, V, VI, VII, VIII, X, and XI, all those groups on the indole ring which are susceptible to reduction, such as nitro and cyano groups, must be either eliminated, protected, or in some cases particular reducing methods used which will reduce the group desired but not others. In those cases where the substituent on the ring is an alkenyl or alkynyl group, the corresponding aldehyde or ketone may be used, whereupon after reduction the aldehyde or ketone is converted to the alkenyl group by means of a Wittig reaction. (This procedure may be employed, however, only when the reduction is carried out with a metal acid.) Generally, when the reducible substituent on the ring is the nitro group, protection of this group from reduction is not easily attainable. However, reduction of Compounds III, VI, VII, X, or XI may be carried out without affecting any nitro group present by reducing with diborane. In those cases wherein the final compound is to contain a cyano on the ring and reduction is required to obtain the compounds of this invention—such as reactions of Compounds III, V, VI, VII, VIII, X, and XI—the carboxamide group may be used in place of the cyano group and after reduction the carboxamide group dehydrated to the desired cyano substituent.

In those cases wherein acylation is required to prepare the compounds of our invention, stoichiometric quantities of indole, metal hydride, and anhydride are advantageously employed. Among anhydrous organic solvents operable herein are the dialkylformamides (such as dimethylformamide, diethylformamide, and the like) aromatic hydrocarbons (such as benzene, toluene, xylene, chlorobenzene, nitrobenzene, and the like), mixtures of said dialkylformamides, and said aromatic hydrocarbons, tertiary butanol, and ethers (such as diethyl ether, 1,2-dimethoxyethane, tetrahydrofuran, and diphenyl ether). Other strong bases that may be advantageously utilized in lieu of the preferred alkali metal hydrides mentioned previously are alkali metal amides (such as sodamide, lithamide, and the like) and alkali metal tertiary alkoxides (such as sodium tertiary butoxide, potassium tertiary butoxide, and the like). An alternative method of acylating the 1-position is by use of a phenolic ester of the acylating acid, such as the p-nitrophenyl ester. The latter is prepared by mixing the acid and p-nitrophenol in tetrahydrofuran and adding dicyclohexylcarbodiimide in tetrahydrofuran slowly. The dicyclohexyl urea which forms is removed by filtration and the nitrophenyl ester is recovered from the filtrate. Whichever is used, the acylation is achieved in either case by employing a strongly basic condensing agent, such as metal hydride.

If it is desired, various reducing agents may be used which are selective in the groups which they are capable of reducing. The reducible groups contemplated in our invention may be described as benzyloxy, alkenyl, alkynyl, cyclopropyl, nitro, cyano, benzylthio, and aldehydo. In those cases where a catalytic reduction may be employed, the benzylthio group will not be affected by this reduction. If a metal acid reduction is possible, alkenyls, alkynyls, cyclopropyl, and aldehydo groups are not affected.

In Steps (3) and (5) (Flow Sheets II, IV, and VI), the respective imine and cyano group may be reduced to the amino group by catalytic, diborane, or metal acid reduction. In Step (4) (Flow Sheets IV and VI), the nitroalkene group may be reduced to the amino group by catalytic or metal acid reduction. The catalytic reduction may be carried out using a noble metal or nickel (1–20%) in an atmosphere of hydrogen, preferably palladium or platinum (5–10%) in an inert solvent (such as alcohols, ethyl acetate, dioxane, ethers, dimethylformamide, and combinations of the same with acids), preferably, however, alcohols and especially lower alkanols. Any convenient temperature may be used (room temperature to 100° C.). It is preferred, however, to use temperatures below 75° C., especially ambient temperatures. The metal acid reduction may be carried out by using a metal whose potential is above that of hydrogen plus a lower aliphatic acid or mineral acid (such as iron, tin, zinc, with hydrochloric acid, sulfuric acid, phosphoric acid, formic acid, acetic acid, or the like), preferably zinc and acetic acid. In addition, when necessary, inert organic solvents may be employed which are capable of dissolving the reactant. The reaction may be carried out at any convenient temperature (room temperature to 100° C.), preferably above 75° C., but especially at steam-bath temperatures. The diborane reduction may be carried out in such solvents as tetrahydrofuran (THF), diglyme, ethers, and the like, preferably THF. Generally, 0.5 mole of diborane is added to the solvent containing the reducible compound; however, more or less diborane may be employed with only subsequent changes in yields. The reaction is normally run at ambient temperatures, but any convenient temperature may be used (5–40° C.). The reaction time depends upon the temperature, solvent, and reactivity of the reducible compound; generally, however, 1–2 hours is a sufficient reaction time. As indicated previously, the diborane reduction is of particular advantage when the reactant contains a nitro group, which, under these conditions, will not be reduced. However, groups such as alkenyl, alkynyl, and aldehydo are susceptible to diborane reduction.

In Steps (2), (3), (4), and (5) (Flow Sheets II, IV, and VI) when further substitution on the amino group is desired, the reaction may be carried out by dissolving the reactants in an inert solvent [ such as dimethylformamide, ethers (diethyl ether and the like), ethyl acetate, alcohols (menthanol, propanol, heptanol, and the like), benzene, toluene, hydrocarbons, and the like, preferably, however, alcohols]. The alkylating agent used may be any mono or dihalide which will afford the desired substituent on the R' and/or R" group. The reaction temperature may vary from 0° C. to the reflux temperature of the solvent, and the reaction time will vary, depending upon the reactivity of the reactants, the temperature, and the solvents employed. Preferably, the alkylation is carried out in a lower alcohol (ethanol) in the presence of an inorganic base (such as $Na_2CO_3$) at the reflux temperature of the solvent for several hours.

The salts of the various amine compounds of our invention may be prepared from the amines in accordance with well-known procedures, as, e.g., dissolving the amine in a suitable organic solvent followed by the addition of the desired acid. If the hydrochloride is desired, the gaseous hydrochloric acid may be bubbled into the amine solution, whereupon precipitated hydrochloride is filtered and washed with an organic solvent (ethanol). Such salts, derived from hydrochloric acid, sulfuric acid, phosphoric acid, tartaric acid, citric acid, lactic acid, acetic acid, sulfamic acid, and like non-toxic acids are within the contemplation of our invention.

The preparataion of the intermediates are indicated in Flow Sheet VII. The reactions and conditions have already been described.

FLOW SHEET VII

Preparation of intermediates

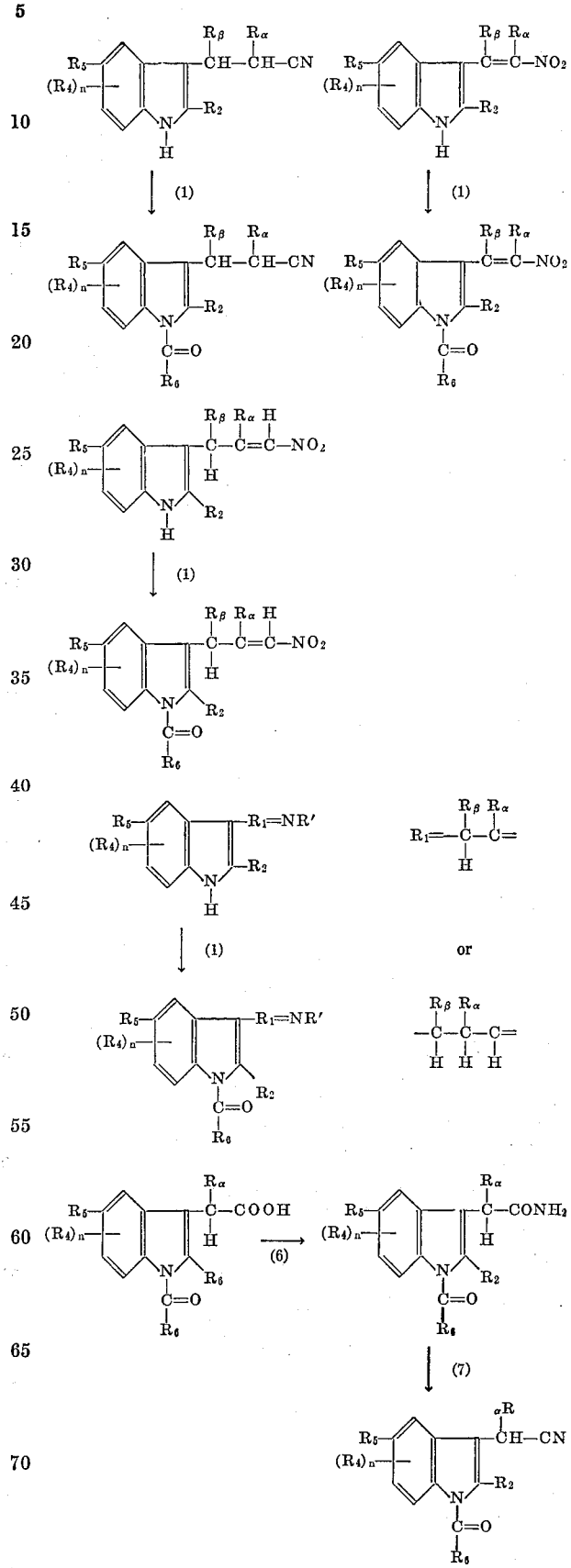

*Equivalents:* Same substituents as previously defined.

The following examples are given by way of illustration.

EXAMPLE 1

2-methyl-3-N,N-dimethylaminomethyl-5-methoxy indole

To a solution of 0.02 mole of 2-methyl - 5 - methoxy indole, 0.22 mole of dimethylamine, and a trace of concentrated hydrochloric acid in 250 ml. of ethanol is added 0.22 mole of 40% formaldehyde and the reaction refluxed for 5 hours. The solution is then cooled and filtered. The precipitated amine hydrochloride salt is dissolved in water and cautiously neutralized with 2.5 N sodium hydroxide. The solution is then extracted with (3× 150 ml.) ether and the ether extract evaporated to yield 2 - methyl - 3 - N,N-dimethylaminomethyl - 5-methoxy indole.

When dibenzylamine, benzylethylamine, di(ethoxy) ethylamine, di(benzyloxy)ethylamine, hydroxyethylamine, di(hydroxypropyl)amine, cyclopropylmethyl amine, cyclobutylmethylamine, piperidine, tetrahydrofurfurylamine, 1,2,5,6-tetrahydropyridine, morpholine, N - methylpiperazine, piperazine, N - phenylpiperazine, cyclohexylamine, pyrrolidine, N - hydroxyethylpiperazine, prop - 2 - en amine, but -2 - yn amine, 2 - methoxyethylamine, and benzyloxyethylamine are used in place of dimethylamine in the above example, there is obtained the corresponding 2 - methyl - 3 - N - substituted-aminomethyl - 5 - methoxy indole. (The aminomethyl or ethylaminomethyl compound is prepared from the dibenzylaminomethyl or benzylethylaminomethyl compound produced by using dibenzylamine or benzylethylamine, above, by reducing the said compound in the presence of palladium and charcoal.)

Similarly, when

2 - methyl - 4 - methyl - 5 - methyl indole,
2-methyl-7-methyl indole,
2-(prop-2-en)-4-benzyloxy indole,
2-methyl-5-benzyloxy indole,
2-methyl-4-ethoxy-5-methoxy indole,
2-methyl-4-nitro-5-methoxy indole,
2-methyl-5-nitro indole,
2-methyl-4-benzylideneamino-5-ethoxy indole,
2-methyl-5-benzylideneamino indole,
4-benzylideneaminoethyl-5-methoxy indole,
2-methyl-5-benzylideneaminoethyl indole,
2-methyl-4-di(ethyl)amino indole,
2-methyl-5-di(propyl) amino indole,
2-methyl-4-acetamido-5-propoxy indole,
2-methyl-5-acetamido indole,
4-acetyl-5-methyl indole,
2-methyl-4-p-methoxyphenyl-5-acetyl indole,
2-methyl-4-di(benzyloxyethyl)amino indole,
2-methyl-5-di(benzyloxypropyl)amino indole,
2-methyl-4-(1'-pyrrolidino)-5-methyl indole,
2-methyl-5-(1'-pyrrolidino) indole,
2-propyl-4-(4'methyl-1'piperazinyl)indole,
2-propyl-5-(4'-methyl-1'-piperazinyl) indole,
4-(4'-morpholinyl) indole,
2-methyl-5-(4'-morpholinyl) indole,
2-methyl-4-cyano-5-methoxy indole,
2-methyl-4-methyl-5-cyano indole,
2-methyl-4-trifluoromethyl-5-methoxy indole,
2-methyl-5-trifluoromethyl indole,
2-methyl-4-chloro-5-methoxy indole,
4-methyl-5-chloro indole,
4-bromo indole,
2-propyl-5-bromo indole,
2-methyl-4-fluoro indole,
2-methyl-5-fluoro indole,
2-methyl-4-dimethylsulfamyl indole,
5-dimethylsulfamyl indole,
2-methyl-4-benzylthio-5-methoxy indole,
2-methyl-4-methyl-5-benzylthio indole,
2-methyl-7-chloro indole,
7-chloro indole, 7-methyl indole,
6-fluoro indole,
2-methyl-5-benzylthio indole,
2-methyl-4-benzyloxy-5-methyl indole,
2-methyl-5-benzyloxy indole,
2-methyl-4-p-ethylbenzyloxy indole,
2-methyl-5-p-ethylbenzyloxy indole,
2-methyl-4-p-bromobenzyloxy-5-methyl indole,
2-methyl-5-p-chlorobenzyloxy indole,
4-allyl indole,
5-allyl indole,
4-(prop-2'-enoxy)-5-methoxy indole,
2-methyl-5-(prop-2'-enoxy) indole,
2-methyl-4-(1'-azacyclopropyl) indole,
5-(1'-azacyclopropyl) indole,
4-cyclopylmethoxymethyl-oxy indole,
5-cyclopropylmethoxymethyloxy indole,
2-methyl-4-cyclobutylethoxymethyloxy-5-methyl indole,
2-methyl-4-methyl-5-cyclobutylethoxymethyloxy indole,
2-methyl-4-dimethylsulfamyl-5-methoxy indole,
2-methyl-5-dimethylsulfamyl indole,
2-methyl-4,5-methylenedioxy indole,
2-methyl-5,6-methylenedioxy indole,
2-methyl-5,6-diethoxy indole,
2-methyl-5,6-dichloro indole,
2-methyl-5-dimethylamino indole, and
2-methyl-4,5,6-tribenzyloxy indole are used in place of 2-methyl-5- methoxy indole in the above example, there are obtained, 2-methyl-3-N,N - dimethylaminomethyl - 4 - methyl-5-methyl indole,
2-methyl - 3 - N,N-dimethylaminomethyl - 7 - methyl indole,
2 - (prop-2-en) - 3 - N,N - dimethylaminomethyl - 4-benzyloxy indole,
2-methyl - 3 - N,N-dimethylaminomethyl - 5 - benzyloxy indole,
2-methyl - 3 - N,N-dimethylaminomethyl - 4 - ethoxy-5-methoxy indole,
2-2-methyl-3-N,N-dimethylaminomethyl-4-nitro-5-methoxy indole,
2-methyl - 3 - N,N-dimethylaminomethyl - 5 - nitro indole,
2-methyl - 3 - N,N-dimethylaminomethyl-4-benzylideneamino-5-ethoxy indole,
2-methyl-3-N,N-dimethylaminomethyl - 5 - benzylideneamino indole,
3 - N,N-dimethylaminomethyl - 4 - benzylideneaminoethyl - 5 - methoxy indole,
2-methyl-3-N,N-dimethylaminomethyl-5-benzylideneaminoethyl indole,
2-methyl - 3 - N,N-dimethylaminomethyl - 4 - di(ethyl) amino indole,
2-methyl - 3 - N,N-dimethylaminamethyl-5-di(propyl)-amino indole,
2-methyl - 3 - N,N-dimethylaminomethyl - 4 - acetamido-5-propoxy indole,
2-methyl - 3 - N,N-dimethylaminomethyl - 5 - acetamido indole,
3 - N,N-dimethylaminomethyl - 4 - acetyl - 5 - methyl indole,
2-methyl - 3 - N,N-dimethylaminomethyl - 4 - p - methoxyphenyl - 5 - acetyl indole,
2 - methyl - 3 - N,N-dimethylaminomethyl - 4 - di(benzyloxyethyl) amino indole,
2-methyl - 3 - N,N-dimethylaminomethyl - 5 - di(benzyloxypropyl)amino indole,
2-methyl - 3 - N,N-dimethylaminomethyl - 4 - (1'-pyrrolidino) - 5 - methyl indole,
2-methyl-3-N,N - dimethylaminomethyl - 5 - (1' pyrrolidino) indole,
2-propyl - 3 - N,N-dimethylaminomethyl - 4 - (4'-methyl-1'-piperazinyl) indole,
2-propyl - 3 - N,N-dimethylaminomethyl-5-(4'-methyl-1'-piperazinyl) indole,
3-N,N-dimethylaminomethyl - 4 - (4' - morpholinyl) indole, 2-methyl - 3 - N,N-dimethylaminomethyl - 5 - (4'-morpholinyl) indole,
2-methyl-3-N,N-dimethylaminomethyl-4-cyano-5-methoxy indole,
2-methyl-3-N,N-dimethylaminomethyl-4-methyl-5-cyano indole,
2-methyl-3-3-N,N-dimethylaminomethyl-4-trifluoromethyl - 5 - methoxy indole
2-methyl-3-N,N-dimethylaminomethyl-5-trifluoromethyl indole,
2-methyl-3-N,N-dimethylaminomethyl-4-chloro-5-methoxy indole,
3-N,N-dimethylaminomethyl - 4 - methyl - 5 - chloro indole,
3-N,N-dimethylaminomethyl - 4 - bromo indole
2-propyl - 3 - N,N-dimethylaminomethyl - 5 - bromo indole,
2-methyl - 3 - N,N-dimethylaminomethyl - 4 - fluoro indole,
2-methyl - 3 - N,N-dimethylaminomethyl - 5 - fluoro indole,
2 - methyl - 3 - N,N-dimethylaminomethyl - 4 - dimethylsulfamyl indole,
3-N,N - dimethylaminomethyl - 5 - dimethylsulfamyl indole,
2 - methyl - 3 - N,N-dimethylaminomethyl - 4 - benzylthio - 5 - methoxy indole,
2-methyl - 3 - N,N-dimethylaminomethyl - 4 - methyl-5-benzylthio indole,
2-methyl - 3 - N,N - dimethylaminomethyl - 7 - chloro indole,
3-N,N-dimethylaminomethyl-7-chloro indole,
3-N,N-dimethylaminomethyl - 7 - methyl indole,
3-N,N-dimethylaminomethyl - 6 - fluoro indole,
2-methyl - 3 - N,N-dimethylaminomethyl - 5 - benzylthio indole,
2-methyl - 3 - N,N-dimethylaminomethyl - 4 - benzyloxy-5-methyl indole,
2-methyl - 3 - N,N-dimethylaminomethyl - 5 - benzyloxy indole,
2-methyl - 3 - N,N-dimethylaminomethyl - 4 - p - ethylbenzyloxy indole,
2-methyl-3-N,N - dimethylaminomethyl - 5 - p - ethylbenzyloxy indole,
2-methyl - 3 - N,N-dimethylaminomethyl - 4 - p-bromobenzyloxy - 5 - methyl indole,
2-methyl - 3 - N,N-dimethylaminomethyl - 5 - p-chlorobenzyloxy indole,
3-N,N-dimethylaminomethyl - 4 - allyl indole,
3-N,N-dimethylaminomethyl - 5 - allyl indole,
3-N,N-dimethylaminomethyl - 4 - (prop - 2' - enoxy)-5-methoxy indole,
2-methyl - 3 - N,N-dimethylaminomethyl - 5 - (prop-2'-enoxy) indole,
2-methyl - 3 - N,N-dimethylaminomethyl - 4 - (1'-azacyclopropyl) indole,
3-N,N-dimethylaminomethyl - 5 - (1' - azacyclopropyl) indole,
3-N,N-dimethylaminomethyl - 4 - cyclopropylmethoxymethyloxy indole,
3-N,N-dimethylaminomethyl - 5 - cyclopropylmethoxymethyloxy indole,
2-methyl - 3 - N,N-dimethylaminomethyl - 4 - cyclobutylethoxymethyloxy - 5 - methyl indole,
2-methyl - 3 - N,N-dimethylaminomethyl - 4 - methyl-5-cyclobutylethoxymethyloxy indole,
2-methyl - 3 - N,N-dimethylaminomethyl - 4 - dimethylsulfamyl - 5 - methoxy indole,
2-methyl - 3 - N,N- dimethylaminomethyl - 5 - dimethylsulfamyl indole,
2-methyl - 3 - N,N-dimethylaminomethyl - 4,5 - methylenedioxy indole,
2-methyl - 3 - N,N-dimethylaminomethyl - 5,6 - methylenedioxy indole,
2-methyl - 3 - N,N-dimethylaminomethyl - 5,6 - diethoxy indole,
2-methyl - 3 - N,N-dimethylaminomethyl - 5,6 - dichloro indole,
2-methyl - 3 - N,N - dimethylaminomethyl - 5 - dimethylamino indole,
and
2-methyl - 3 - N,N-dimethylaminomethyl - 4,5,6 - tribenzoyloxy indole respectively.

EXAMPLE 2

1-p-chlorobenzoyl-2-methyl-5-methoxy indole

A solution of 0.021 mole of 2-methyl - 5 - methoxy indole in 20 ml. of dimethylformamide is added dropwise to a cold suspension of 1.0 gram (0.22 mole) of sodium hydride (52% dispersion in mineral oil) and 25 ml. of dimethylformamide. The mixture is stirred at room temperature for 20 minutes, cooled, and treated with (0.0222 mole) p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to give 1-p-chlorobenzoyl-2-methyl - 5 - methoxy indole.

Similarly, when using 3,4,5-trimethoxybenzoyl chloride,
p-trifluoroacetylbenzoyl chloride,
p-N,N-dimethylsulfamylbenzoyl chloride,
p-difluoroacetylbenzoic acid,
p-carbomethoxybenzoyl chloride,
p-formylbenzoyl chloride,
p-trifluoromethylthiobenzoyl chloride,
N,N-dimethyl-p-sulfonamidobenzoyl chloride,
p-methylsulfinylbenzoyl chloride,
p-methylsulfonylbenzoyl chloride,
p-benzylthiobenzoyl chloride,
2-thenoyl chloride,
3-thenoyl chloride,
4-thiazole carbonyl chloride,
5-chloro-2-furoyl chloride,
5-methyl-4-oxazole carbonyl chloride,
p-nitrophenyl nicotinate,
p-dimethylaminobenzoyl chloride,
p-acetaminobenzoyl chloride,
o-fluoro-p-chlorobenzoyl chloride,
o-methoxy-p-chlorobenzoyl chloride, and
2,4,5-trichlorobenzoyl chloride in place of p-chlorobenzoyl chloride in the above example, there are obtained 1-3,4,5-trimethoxybenzoyl-2-methyl-5-methoxy indole,
1-p-trifluoroacetylbenzoyl-2-methyl-5-methoxy indole,
1-p-N,N-dimethylsulfamylbenzoyl-2-methyl-5-methoxy indole,
1-p-difluoroacetylbenzoyl-2-methyl-5-methoxy indole,
1-p-carbomethoxybenzoyl-2-methyl-5-methoxy indole,
1-p-formylbenzoyl-2-methyl-5-methoxy indole,
1-p-trifluoromethylthiobenzoyl-2-methyl-5-methoxy indole,
1-N,N-dimethyl-p-sulfonamidobenzoyl-2-methyl-5-methoxy indole,
1-p-methylsulfinylbenzoyl-2-methyl-5-methoxy indole,
1-p-methylsulfonylbenzoyl-2-methyl-5-methoxy indole,
1-p-benzylthiobenzoyl-2-methyl-5-methoxy indole,
1-2-thenoyl-2-methyl-5-methoxy indole,
1-3-thenoyl-2-methyl-5-methoxy indole,
1-4-thiazole carbonyl-2-methyl-5-methoxy indole,
1-5-chloro-2-furoyl-2-methyl-5-methoxy indole,
1-5-methyl-4-oxazole carbonyl-2-methyl-5-methoxy indole,
1-nicotinoyl-2-methyl-5-methoxy indole,
1-p-dimethylaminobenzoyl-2-methyl-5-methoxy indole,
1-p-acetaminobenzoyl-2-methyl-5-methoxy indole,
1-o-fluoro-p-chlorobenzoyl-2-methyl-5-methoxy indole, 1-o-methoxy-p-chlorobenzoyl-2-methyl-5-methoxy indole, and
1-2,4,5-trichlorobenzoyl-2-methyl-5-methoxy indole respectively.

Similarly, when 2-methyl-4-methyl-5-methyl indole,
2-methyl-7-methyl indole,
2-(prop-2-en)-4-benzyloxy indole,
2-methyl-5-benzyloxy indole,
2-methyl-4-ethoxy-5-methoxy indole,
2-methyl-4-nitro-5-methoxy indole,
2-methyl-5-nitro indole,
2-methyl-4-benzylideneamino-5-ethoxy indole,
2-methyl-5-benzylideneamino indole,
4-benzylideneaminoethyl-5-methoxy indole,
2-methyl-5-benzylideneaminoethyl indole,
2-methyl-4-di(ethyl)amino indole,
2-methyl-5-di(propyl)amino indole,
2-methyl-4-acetamido-5-propoxy indole,
2-methyl-5-acetamido indole,
4-acetyl-5-methyl indole,
2-methyl-4-p-methoxyphenyl-5-acetyl indole,
2-methyl-4-di(benzyloxyethyl)amino indole,
2-methyl-5-di(benzyloxypropyl)amino indole,
2-methyl-4-(1'-pyrrolidino)-5-methyl indole,
2-methyl-5-(1'-pyrrolidino) indole,
2-propyl-4-(4'-methyl-1'-piperazinyl) indole,
2-propyl-5-(4'-methyl-1'-piperazinyl) indole,
4-(4'-morpholinyl) indole,
2-methyl-5-(4'-morpholinyl) indole,
2-methyl-4-cyano-5-methoxy indole,
2-methyl-4-methyl-5-cyano indole,
2-methyl-4-trifluoromethyl-5-methoxy indole,
2-methyl-5-trifluoromethyl indole,
2-methyl-4-chloro-5-methoxy indole,
4-methyl-5-chloro indole,
4-bromo indole,
2-propyl-5-bromo indole,
2-methyl-4-fluoro indole,
2-methyl-5-fluoro indole,
2-methyl-4-dimethylsulfamyl indole,
5-dimethylsulfamyl indole,
2-methyl-4-benzylthio-5-methoxy indole,
2-methyl-4-methyl-5-benzylthio indole,
2-methyl-7-chloro indole,
7-chloro indole,
7-methyl indole,
6-fluoro indole,
2-methyl-5-benzylthio indole,
2-methyl-4-benzyloxy-5-methyl indole,
2-methyl-5-benzyloxy indole,
2-methyl-4-p-ethylbenzyloxy indole,
2-methyl-5-p-ethylbenzyloxy indole,
2-methyl-4-p-bromobenzyloxy-5-methyl indole,
2-methyl-5-p-chlorobenzyloxy indole,
4-allyl indole,
5-allyl indole,
4-(prop-2'-enoxy)-5-methoxy indole,
2-methyl-5-(prop-2'-enoxy) indole,
2-methyl-4-(1'-azacyclopropyl) indole,
5-(1'-azacyclopropyl) indole,
4-cyclopropylmethoxymethyloxy indole,
5-cyclopropylmethoxymethyloxy indole,
2-methyl-4-cyclobutylethoxymethyloxy-5-methyl indole,
2-methyl-4-methyl-5-cyclobutylethoxymethyloxy indole,
2-methyl-4-dimethylsulfamyl-5-methoxy indole,
2-methyl-5-dimethylsulfamyl indole,
2-methyl-4,5-methylenedioxy indole,
2-methyl-5,6-methylenedioxy indole,
2-methyl-5,6-diethoxy indole,
2-methyl-5,6-dichloro indole,
2-methyl-5-dimethylamino indole, and
2-methyl-4,5,6-tribenzyloxy indole are used in place of 2-methyl-5-methoxy indole in the above example, there are obtained 1-p-chlorobenzoyl-2-methyl-4-methyl-5-methyl indole,
1-p-chlorobenzoyl-2-methyl-7-methyl indole,
1-p-chlorobenzoyl-2-(prop-2-en)-4-benzyloxy indole,
1-p-chlorobenzoyl-2-methyl-5-benzyloxy indole,
1-p-chlorobenzoyl-2-methyl-4-ethoxy-5-methoxy indole,
1-p-chlorobenzoyl-2-methyl-4-nitro-5-methoxy indole,
1-p-chlorobenzoyl-2-methyl-5-nitro indole,
1-p-chlorobenzoyl-2-methyl-4-benzylideneamino-5-ethoxy indole,
1-p-chlorobenzoyl-2-methyl-5-benzylideneamino indole,
1-p-chlorobenzoyl-4-benzylideneaminoethyl-5-methoxy indole,
1-p-chlorobenzoyl-2-methyl-5-benzylideneaminoethyl indole,
1-p-chlorobenzoyl-2-methyl-4-di(ethyl)amino indole,
1-p-chlorobenzoyl-2-methyl-5-di(propyl)amino indole,
1-p-chlorobenzoyl-2-methyl-4-acetamido-5-propoxy indole,
1-p-chlorobenzoyl-2-methyl-5-acetamido indole,
1-p-chlorobenzoyl-4-acetyl-5-methyl indole,
1-p-chlorobenzoyl-2-methyl-4-p-methoxyphenyl-5-acetyl indole,
1-p-chlorobenzoyl-2-methyl-4-di(benzyloxyethyl)amino indole,
1-p-chlorobenzoyl-2-methyl-5-di(benzyloxypropyl)amino indole,
1-p-chlorobenzoyl-2-methyl-4-(1'-pyrrolidino)-5-methyl indole,
1-p-chlorobenzoyl-2-methyl-5-(1'-pyrrolidino) indole,
1-p-chlorobenzoyl-2-propyl-4-(4'-methyl-1'-piperazinyl) indole,
1-p-chlorobenzoyl-2-propyl-5-(4'-methyl-1'-piperazinyl) indole,
1-p-chlorobenzoyl-4-(4'-morpholinyl) indole,
1-p-chlorobenzoyl-2-methyl-5-(4'-morpholinyl) indole,
1-p-chlorobenzoyl-2-methyl-4-cyano-5-methoxy indole,
1-p-chlorobenzoyl-2-methyl-4-methyl-5-cyano indole,
1-p-chlorobenzoyl-2-methyl-4-trifluoromethyl-5-methoxy indole,
1-p-chlorobenzoyl-2-methyl-5-trifluoromethyl indole,
1-p-chlorobenzoyl-2-methyl-4-chloro-5-methoxy indole,
1-p-chlorobenzoyl-4-methyl-5-chloro indole,
1-p-chlorobenzoyl-4-bromo indole,
1-p-chlorobenzoyl-2-propyl-5-bromo indole,
1-p-chlorobenzoyl-2-methyl-4-fluoro indole,
1-p-chlorobenzoyl-2-methyl-5-fluoro indole,
1-p-chlorobenzoyl-2-methyl-4-dimethylsulfamyl indole,
1-p-chlorobenzoyl-5-dimethyl-sulfamyl indole,
1-p-chlorobenzoyl-2-methyl-4-benzylthio-5-methoxy indole,
1-p-chlorobenzoyl-2-methyl-4-methyl-5-benzylthio indole,
1-p-chlorobenzoyl-2-methyl-7-chloro indole,
1-p-chlorobenzoyl-7-chloro indole,
1-p-chlorobenzoyl-7-methyl indole,
1-p-chlorobenzoyl-6-fluoro indole,
1-p-chlorobenzoyl-2-methyl-5-benzylthio indole,
1-p-chlorobenzoyl-2-methyl-4-benzyloxy-5-methyl indole,
1-p-chlorobenzoyl-2-methyl-5-benzyloxy indole,
1-p-chlorobenzoyl-2-methyl-4-p-ethylbenzyloxy indole,
1-p-chlorobenzoyl-2-methyl-5-p-ethylbenzyloxy indole,
1-p-chlorobenzoyl-2-methyl-4-p-bromobenzyloxy-5-methyl indole,
1-p-chlorobenzoyl-2-methyl-5-p-chlorobenzyloxy indole,
1-p-chlorobenzoyl-4-allyl indole,
1-p-chlorobenzoyl-5-allyl indole,
1-p-chlorobenzoyl-4-(prop-2'-enoxy)-5-methoxy indole,
1-p-chlorobenzoyl-2-methyl-5-(prop-2'-enoxy) indole,
1-p-chlorobenzoyl-2-methyl-4-(1'-azacyclopropyl) indole,
1-p-chlorobenzoyl-5-(1'-azacyclopropyl) indole,
1-p-chlorobenzoyl-4-cyclopropylmethoxymethyloxy indole, 1-p-chlorobenzoyl-5-cyclopropylmethoxymethyloxy indole,
1-p-chlorobenzoyl-2-methyl-4-cyclobutylethoxymethyloxy-5-methyl indole,
1-p-chlorobenzoyl-2-methyl-4-methyl-5-cyclobutylethoxymethyloxy indole,
1-p-chlorobenzoyl-2-methyl-4-dimethylsulfamyl-5-methoxy indole,
1-p-chlorobenzoyl-2-methyl-5-dimethylsulfamyl indole,
1-p-chlorobenzoyl-2-methyl-4,5-methylenedioxy indole,
1-p-chlorobenzoyl-2-methyl-5,6-methylenedioxy indole,
1-p-chlorobenzoyl-2-methyl-5,6-diethoxy indole,
1-p-chlorobenzoyl-2-methyl-5,6-dichloro indole,
1-p-chlorobenzoyl-2-methyl-5-dimethylamino indole, and
1-p-chlorobenzoyl-2-methyl-4,5,6-tribenzyloxy indole
respectively.

EXAMPLE 3

2-methyl-3-formyl-5-methoxy indole 4 ml. (0.044 mole) of phosphorus oxychloride is added dropwise into 15 grams of dimethylformamide and the temperature of the solution maintained between 10–20° C. To the solution is added 11.42 grams (0.4 mole) of 2-methyl-5-methoxy indole in 30 grams of dimethylformamide. The solution is stirred for 1 hour at 30–40° C. The reaction mixture is then poured into ice water and made alkaline with 7.5 grams of sodium hydroxide in 40 ml. of water. The solution is then heated on a steam batht for 2 to 3 minutes, cooled, and extracted with ether (3× 100 ml.). The ethereal solution is then washed with (3× 25 ml.) water and dried over sodium sulfate. Evaporation of the solvent yields 2-methyl-3-formyl-5-methoxy indole.

Similarly, when 2-methyl-4-methyl-5-methyl indole, 2-methyl-7-methyl indole,
2-(prop-2-en)-4-benzyloxy indole,
2-methyl-5-benzyloxy indole,
2-methyl-4-ethoxy-5-methoxy indole,
2-methyl-4-nitro-5-methoxy indole,
2-methyl-5-nitro indole,
2-methyl-4-benzylideneamino-5-ethoxy indole,
2-methyl-5-benzylideneamino indole,
4-benzylideneaminoethyl-5-methoxy indole,
2-methyl-5-benzylideneaminoethyl indole,
2-methyl-4-di(ethyl)amino indole,
2-methyl-5-di(propyl)amino indole,
2-methyl-4-acetamido-5-propoxy indole,
2-methyl-5-acetamido indole,
4-acetyl-5-methyl indole,
2-methyl-4-p-methoxyphenyl-5-acetyl indole,
2-methyl-4-di(benzyloxyethyl)amino indole,
2-methyl-5-di(benzyloxypropyl)amino indole,
2-methyl-4-(1'-pyrrolidino)-5-methyl indole,
2-methyl-5-(1'-pyrrolidino) indole,
2-propyl-4-(4'-methyl-1'-piperazinyl) indole,
2-propyl-5-(4'-methyl-1'-piperazinyl) indole,
4-(4'-morpholinyl) indole,
2-methyl-5-(4'-morpholinyl) indole,
2-methyl-4-cyano-5-methoxy indole,
2-methyl-4-methyl-5-cyano indole,
2-methyl-4-trifluoromethyl-5-methoxy indole,
2-methyl-5-trifluoromethyl indole,
2-methyl-4-chloro-5-methoxy indole,
4-methyl-5-chloro indole,
4-bromo indole, 2-propyl-5-bromo indole,
2-methyl-4-fluoro indole,
2-methyl-5-fluoro indole,
2-methyl-4-dimethylsulfamyl indole,
5-dimethylsulfamyl indole,
2-methyl-4-benzylthio-5-methoxy indole,
2-methyl-4-methyl-5-benzylthio indole,
2-methyl-7-chloro indole,
7-chloro indole,
7-methyl indole,
6-fluoro indole,
2-methyl-5-benzylthio indole,
2-methyl-4-benzyloxy-5-methyl indole,
2-methyl-5-benzyloxy indole,
2-methyl-4-p-ethylbenzyloxy indole,
2-methyl-5-p-ethylbenzyloxy indole,
2-methyl-4-p-bromobenzyloxy-5-methyl indole,
2-methyl-5-p-chlorobenzyloxy indole,
4-allyl indole,
5-allyl indole,
4-(prop-2'-enoxy)-5-methoxy indole,
2-methyl-5-(prop-2'-enoxy) indole,
2-methyl-4-(1'-azacyclopropyl) indole,
5-(1'-azacyclopropyl) indole,
4-cyclopropylmethoxymethyloxy indole,
5-cyclopropylmethoxymethyloxy indole,
2-methyl-4-cyclobutylethoxymethyloxy-5-methyl indole,
2-methyl-4-methyl-5-cyclobutylethoxymethyloxy indole,
2-methyl-4-dimethylsulfamyl-5-methoxy indole,
2-methyl-5-dimethylsulfamyl indole,
2-methyl-4,5-methylenedioxy indole,
2-methyl-5,6-methylenedioxy indole,
2-methyl-5,6-diethoxy indole,
2-methyl-5,6-dichloro indole,
2-methyl-5-dimethylamino indole, and
2-methyl-4,5,6-tribenzyloxy indole are used in place of 2-methyl-5-methoxy indole in the above example, there are obtained 2-methyl-3-formyl-4-methyl-5-methyl indole,
2-methyl-3-formyl-7-methyl indole,
2-(prop-2-en)-3-formyl-4-benzyloxy indole,
2-methyl-3-formyl-5-benzyloxy indole,
2-methyl-3-formyl-4-ethoxy-5-methoxy indole,
2-methyl-3-formyl-4-nitro-5-methoxy indole,
2-methyl-3-formyl-5-nitro indole,
2-methyl-3-formyl-4-benzylideneamino-5-ethoxy indole,
2-methyl-3-formyl-5-benzylideneamino indole,
3-formyl-4-benzylideneaminoethyl-5-methoxy indole,
2-methyl-3-formyl-5-benzylideneaminoethyl indole,
2-methyl-3-formyl-4-di(ethyl)amino indole,
2-methyl-3-formyl-5-di(propyl)amino indole,
2-methyl-3-formyl-4-acetamido-5-propoxy indole,
2-methyl-3-formyl-5-acetamido indole,
3-formyl-4-acetyl-5-methyl indole,
2-methyl-3-formyl-4-p-methoxyphenyl-5-acetyl indole,
2-methyl-3-formyl-4-di(benzyloxethyl)amino indole,
2-methyl-3-formyl-5-di(benzyloxypropyl)amino indole,
2-methyl-3-formyl-4-(1'-pyrrolidino)-5-methyl indole,
2-methyl-3-formyl-5-(1'-pyrrolidino) indole,
2-propyl-3-formyl-4-(4'-methyl-1'-piperazinyl) indole,
2-propyl-3-formyl-5-(4'-methyl-1'-piperazinyl) indole,
3-formyl-4-(4'-morpholinyl) indole,
2-methyl-3-formyl-5-(4'morpholinyl) indole,
2-methyl-3-formyl-4-cyano-5-methoxy indole,
2-methyl-3-formyl-4-methyl-5-cyano indole,
2-methyl-3-formyl-4-trifluoromethyl-5-methoxy indole,
2-methyl-3-formyl-5-trifluoromethyl indole,
2-methyl-3-formyl-4-chloro-5-methoxy indole,
3-formyl-4-methyl-5-chloro indole,
3-formyl-4-bromo indole,
2-propyl-3-formyl-5-bromo indole,
2-methyl-3-formyl-4-fluoro indole,
2-methyl-3-formyl-5-fluoro indole,
2-methyl-3-formyl-4-dimethylsulfamyl indole,
3-formyl-5-dimethylsulfamyl indole,
2-methyl-3-formyl-4-benzylthio-5-methoxy indole,
2-methyl-3-formyl-4-methyl-5-benzylthio indole,
2-methyl-3-formyl-7-chloro indole,
3-formyl-7-chloro indole,
3-formyl-7-methyl indole,
3-formyl-6-fluoro indole,
2-methyl-3-formyl-5-benzylthio indole,
2-methyl-3-formyl-4-benzyloxy-5-methyl indole,
2-methyl-3-formyl-5-benzyloxy indole,
2-methyl-3-formyl-4-p-ethylbenzyloxy indole,
2-methyl-3-formyl-5-p-ethylbenzyloxy indole, 2-methyl-3-formyl-4-p-bromobenzyloxy-5-methyl indole,
2-methyl-3-formyl-5-p-chlorobenzyloxy indole,
3-formyl-4-allyl indole,
3-formyl-5-allyl indole,
3-formyl-4-(prop-2'-enoxy)-5-methoxy indole,
2-methyl-3-formyl-5-(prop-2'-enoxy) indole,
2-methyl-3-formyl-4-(1'-azacyclopropyl) indole,
3-formyl-5-(1'-azacyclopropyl) indole,
3-formyl-4-cyclopropylmethoxymethyloxy indole,
3-formyl-5-cyclopropylmethoxymethyloxy indole,
2-methyl-3-formyl-4-cyclobutylethoxymethyloxy-5-methyl indole,
2-methyl-3-formyl-4-methyl-5-cyclobutylethoxymethyloxy indole,
2-methyl-3-formyl-4-dimethylsulfamyl-5-methoxy indole,
2-methyl-3-formyl-5-dimethylsulfamyl indole,
2-methyl-3-formyl-4,5-methylenedioxy indole,
2-methyl-3-formyl-5,6-methylenedioxy indole,
2-methyl-3-formyl-5,6-diethoxy indole,
2-methyl-3-formyl-5,6-dichloro indole,
2-methyl-3-formyl-5-dimethylamino indole, and 2-methyl-3-formyl-4,5,6-tribenzyloxy indole respectively.

EXAMPLE 4

2-methyl-3-acetyl-5-methyl indole

To a solution of 200 ml. of acetic anhydride and 10.8 grams of sodium acetate is added 28 grams of 2-methyl-5-methyl indole. The solution is refluxed for 6 hours and then concentrated in vacuo to a small volume. The mixture is then triturated in ice water and extracted with (3× 150 ml.) ether. The ethereal solution is washed with sodium bicarbonate, water, and dried over sodium sulfate. The solution is then filtered and concentrated to yield 2-methyl-3-acetyl-5-methyl indole.

When chloro acetic anhydride, butanoic anhydride, β-methoxy propionic anhydride, β-benzyloxy propionic anhydride, β-propenoic anhydride, benzoic anhydride, and γ-butynoic anhydride are used in place of acetic anhydride in the above example, there are obtained the corresponding 2-methyl-3-acyl-5-methyl indoles.

Similarly, when 2-methyl - 4-methyl - 5-methyl indole, 2-methyl - 7-methyl indole, 2-(prop-2-en)-4-benzyloxy indole, 2 - methyl - 5 - benzyloxy indole, 2 - methyl-4-ethoxy - 5-methoxy indole, 2-methyl-4-nitro-5-methoxy indole, 2-methyl - 5-nitro indole, 2-methyl-4-benzylideneamino - 5-ethoxy indole, 2 - methyl - 5-benzylideneamino indole, 4-benzylideneaminoethyl - 5-methoxy indole, 2-methyl - 5-benzylideneaminoethyl indole, 2-methyl - 4-di(ethyl)amino indole, 2-methyl - 5 - di(propyl)amino indole, 2-methyl - 4-acetamido - 5-propoxy indole, 2-methyl-5-acetamido indole, 4-acetyl - 5-methyl indole, 2-methyl-4-p-methoxyphenyl - 5 - acetyl indole, 2-methyl-4-di(benzyloxyethyl)amino indole, 2 - methyl - 5-di(benzyloxypropyl)amino indole, 2 - methyl - 4 - (1'-pyrrolidino)-5-methyl indole, 2-methyl - 5-(1'-pyrrolidino) indole, 2-propyl - 4-(4' - methyl-1'-piperazinyl) indole, 2-propyl-5-(4' - methyl - 1'-piperazinyl) indole, 4 - (4'-morpholinyl) indole, 2-methyl - 5-(4'-morpholinyl) indole, 2-methyl - 4-cyano - 5-methoxy indole, 2-methyl - 4-methyl-5-cyano indole, 2-methyl - 4-trifluoromethyl - 5-methoxy indole, 2-methyl - 5-trifluoromethyl indole, 2 - methyl-4-chloro - 5-methoxy indole, 4-methyl - 5-chloro indole, 4-bromo indole, 2 - propyl-5 - bromo indole, 2-methyl-4-fluoro indole, 2 - methyl-5-fluoro indole, 2 - methyl-4-dimethylsulfamyl indole, 5 - dimethylsulfamyl indole, 2-methyl-4-benzylthio-5 - methoxy indole, 2 - methyl - 4-methyl - 5-benzylthio indole, 2-methyl - 7-chloro indole, 7-chloro indole, 7 - methyl indole, 6-fluoro indole, 2-methyl - 5-benzylthio indole, 2 - methyl-4 - benzyloxy-5-methyl indole, 2 - methyl 5-benzyloxy indole, 2-methyl-4-p - ethylbenzyloxy indole, 2 - methyl-5-p - ethylbenzyloxy indole, 2-methyl - 4-p-bromobenzyloxy - 5-methyl indole, 2-methyl - 5-p-chlorobenzyloxy indole, 4 - allyl indole, 5-allyl indole, 4 - (prop-2' - enoxy) - 5-methoxy indole, 2-methyl - 5-(prop - 2'-enoxy) indole, 2 -methyl-4-(1'-azacyclopropyl) indole, 5 - (1'-azacyclopropyl) indole, 4-cyclopropylmethoxymethyloxy indole, 5 - cyclopropylmethoxymethyloxy indole, 2 - methyl-4 - cyclobutylethoxymethyloxy - 5-methyl indole, 2 - methyl-4-methyl - 5 - cyclobutylethoxymethyloxy indole, 2-methyl-4 - dimethylsulfamyl - 5-methoxy indole, 2 - methyl-5-dimethyl - sulfamyl indole, 2 - methyl - 4,5 - methylenedioxy indole, 2 - methyl - 5,6-methylenedioxy indole, 2-methyl - 5,6-diethoxy indole, 2 - methyl-5,6-dichloro indole, 2-methyl - 5-dimethylamino indole, and 2-methyl-4,5,6-tribenzyloxy indole are used in place of 2-methyl-5-methoxy indole in the above example, there are obtained 2-methyl - 3-acetyl-4 - methyl-5 - methyl indole, 2-methyl - 3-acetyl-7 - methyl indole, 2-(prop - 2-en)-3-acetyl - 4-benzyloxy indole, 2-methyl - 3-acetyl - 5-benzyloxy indole, 2-methyl - 3-acetyl-4-ethoxy-5-methoxy indole, 2-methyl - 3-acetyl-4-nitro - 5-methoxy indole, 2-methyl - 3-acetyl - 5-nitro indole, 2-methyl - 3-acetyl-4-benzylideneamino - 5-ethoxy indole, 2-methyl - 3-acetyl 5 - benzylideneamino indole, 3 - acetyl - 4 - benzylideneaminoethyl - 5-methoxy indole, 2-methyl - 3-acetyl-5-benzylideneaminoethyl indole, 2 - methyl-3 - acetyl-4 - di(ethyl)amino indole, 2 - methyl-3 - acetyl-5 - di(propyl)amino indole, 2-methyl - 3-acetyl-4 - acetamido-5 - propoxy indole, 2-methyl - 3-acetyl-5 - acetamido indole, 3-acetyl - 4-acetyl-5 - methyl indole, 2-methyl - 3-acetyl-4-p - methoxyphenyl - 5-acetyl indole, 2-methyl - 3-acetyl-4-di(benzyloxyethyl) amino indole, 2 - methyl-3 - acetyl-5 - di(benzyloxypropyl) amino indole, 2-methyl-3-acetyl-4-(1' - pyrrolidino - 5-methyl indole, 2-methyl - 3-acetyl-5-(1'-pyrrolidino) indole, 2 - propyl-3 - acetyl-4 - (4'-methyl - 1' - piperazinyl)indole, 2 - propyl - 3 - acetyl-5-(4'-methyl - 1'-piperazinyl) indole, 3-acetyl - 4-(4'-methyl - 1'-piperazinyl) indole, 3-acetyl - 4-(4'-morpholinyl) indole, 2 - methyl - 3-acetyl - 5-(4'-morpholinyl) indole, 2 - methyl - 3-acetyl - 4-cyano - 5-methoxy indole, 2-methyl - 3-acetyl- 4 - methyl-5-cyano indole, 2-methyl - 3-acetyl-4 - trifluoromethyl - 5-methoxy indole, 2 - methyl - 3-acetyl-5 - trifluoromethyl indole, 2-methyl - 3-acetyl-4 - chloro-5 - methoxy indole, 3-acetyl-4-methyl - 5-chloro indole, 3-acetyl - 4-bromo indole, 2-propyl - 3-acetyl-5 - bromo indole, 2-methyl - 3-acetyl-4-fluoro indole, 2-methyl - 3-acetyl - 5-fluoro indole, 2-methyl - 3-acetyl-4 - dimethylsulfamyl indole, 3-acetyl-5-dimethylsulfamyl indole, 2-methyl - 3-acetyl-4 - benzylthio-5-methoxy indole, 2 - methyl-3 - acetyl-4-methyl-5-benzylthio indole, 2 - methyl - 3-acetyl-7 - chloro indole, 3-acetyl - 7-chloro indole, 3-acetyl - 7-methyl indole, 3-acetyl - 6-fluoro indole, 2-methyl - 3-acetyl-5-benzylthio indole, 2-methyl - 3-acetyl - 4-benzyloxy - 5-methyl indole, 2-methyl-3 - acetyl-5 - benzyloxy indole, 2-methyl-3-acetyl - 4-p-ethylbenzyloxy indole, 2 - methyl-3 - acetyl-5-p-ethylbenzyloxy indole, 2-methyl - 3-acetyl - 4 - p-bromobenzyloxy - 5-methyl indole, 2-methyl - 3-acetyl-5-p-chlorobenzyloxy indole, 3-acetyl - 4-allyl indole, 3-acetyl - 5-allyl indole, 3-acetyl - 4-(prop - 2'-enoxy) - 5-methoxy indole, 2-methyl - 3-acetyl - 5-(prop - 2'-enoxy) indole, 2-methyl - 3-acetyl-4 - (1'-azacyclopropyl) indole, 3-acetyl - 5-(1'-azacyclopropyl )indole, 3 - acetyl-4-cyclopropylmethoxymethyloxy indole, 3 - acetyl - 5-cyclopropylmethoxymethyloxy indole, 2-methyl - 3-acetyl-4 - cyclobutylethoxymethyloxy-5-methyl indole, 2-methyl-3- acetyl - 4-methyl - 5-cyclobutylethoxymethyloxy indole, 2-methyl - 3-acetyl - 4-dimethylsulfamyl-5-methoxy indole, 2 - methyl - 3 - acetyl - 5-dimethylsulfamyl indole, 2-methyl-3 - acetyl - 4,5-methylenedioxy indole, 2-methyl-3-acetyl - 5,6 - methylenedioxy indole, 2-methyl - 3-acetyl-5,6-diethoxy indole, 2-methyl - 3-acetyl - 5,6-dichloro indole, 2-methyl - 3-acetyl - 5-dimethylamino indole, and 2-methyl - 3-acetyl - 4,5,6-tribenzyloxy indole respectively. In those cases where anhydrides or acid chloride cannot be used as solvents also, dimethoxythane is used.

EXAMPLE 5

2-methyl-3-ethyliminomethyl-5-methoxy indole

A mixture of 0.02 mole of 2-methyl-3-aldehyde - 5-methoxy indole and 250 ml. of ethylamine is stirred at room temperature for 1 hour. The solution is then concentrated in vacuo to yield crude 2-methyl-3-ethyl-iminomethyl-5-methoxy indole.

When the 3-aldehyde substituted indoles obtained from Example 3 and the 3-keto substituted indoles obtained from Example 4 are used in place of 2-methyl-3-aldehyde-5-methoxy indole in the above example, there are obtained the corresponding 3-ethyliminomethyl indoles and 3-ethyl-imino substituted methyl indoles respectively.

Similarly, when methylamine, 3-fluoropropylamine, 3-hydroxypropylamine, prop - 2-en-amine, but-3-yn-amine, methoxyethylamine, benzylethylamine, cyclopropylmethyl-amine, cyclohexylamine, tetrahydrofurfurylamine, and cyclobutylmethylamine are used in place of ethylamine in the above example, there are obtained the corresponding 3-substituted-iminomethyl indoles.

EXAMPLE 6

2-methyl-3-ethylaminomethyl-5-methoxy indole 0.1 gram of 5% palladium on alumina is added to a solution of 0.01 mole of 2-methyl-3-ethyliminomethyl-5-methoxy indole in 200 ml. of methanol and the solution reduced at room temperature under an atmosphere of hydrogen. The solution is then filtered and the filtrate evaporated to dryness to yield crude 2-methyl-3-ethyl-aminomethyl-5-methoxy indole.

When the 3 - ethyliminomethyl substituted indoles, 2-methyl - 3-substitutediminomethyl - 5-methoxy indoles, and 3-imino - substitutedmethyl indoles obtained from Example 5 are used in place of 2-methyl-3-ethyliminomethyl-5-methoxy indole in the above example, there are obtained the corresponding 3-aminomethyl substituted indoles, 3-(amino - substitutedmethyl) indoles, and 2-methyl-3-substitutedaminomethyl - 5-methoxy indoles respectively. (Those compounds containing groups which are affected by the above reduction are not used or must be protected. Examples of such groups are cyano, nitro, alkenyl, and the like. However, in those cases where a dibenzylamino group and benzyloxy group are present and the respective amino or hydroxy group is desired, this reduction step will convert those groups to the desired groups.)

EXAMPLE 7

2-methyl-3-benzylideneaminomethyl-5-methoxy indole

A solution of 0.02 mole of 2-methyl-3-aminomethyl-5-methoxy indole and 0.02 mole of benzaldehyde in 200 ml. of benzene is refluxed for 1 hour. The benzene solution is then distilled until water no longer comes off. At this point, the solution is concentrated in vacuo. The concentrate is then filtered and the cake washed with cold (2× 25 ml.) ethanol. The cake is then dried in vacuo to yield 2-methyl-3-benzylideneaminomethyl-5-methoxy indole.

When the 3-aminomethyl substituted indoles obtained from Example 6 are used in place of the 2-methyl-3-aminomethyl-5-methoxy indole in the above example, there are obtained the corresponding 3-benzylideneaminomethyl substituted indoles.

EXAMPLE 8

2-methyl-3-N,N-diethylaminomethyl-5-methoxy indole

A mixture of 0.01 mole of 2-methyl-3-aminomethyl-5-methoxy indole, 0.022 mole of ethyl iodide and 0.015 mole of sodium bicarbonate in 50 ml. of anhydrous 1,2-dimethoxyethane is stirred at room temperature under nitrogen for 8 hours. The mixture is then filtered and the solvent removed in vacuo. The residue thus obtained is chromatographed on 150 grams of a neutral alumina column and eluted with ether-petroleum ether (v./v. 20–100%) to obtain 2-methyl-3-N,N-diethylaminomethyl - 5 - methoxy indole.

When the (3-aminomethyl) substituted indoles, 3-(amino-substituted methyl) indoles, and 2-methyl-3-substituted aminomethyl-5-methoxy indoles obtained from Example 6 are used in place of 2-methyl-3-N,N-diethylaminomethyl-5-methoxy indole in the above example, there are obtained the corresponding N,N-diethylamino substituted indoles, diethylamino-substituted methyl indoles, and 2-methyl-3-ethyl-substituted aminomethyl-5-methoxy indoles.

Similarly, when 1-iodo-3-chloropropane, 3-benzyloxypropyl bromide, 3-bromopropanol, allyl bromide, 1-bromide-prop-3-yne, 3-methoxypropyl bromide, cyclopropylmethyl bromide, cyclobutylmethyl bromide, 1,5-diiodopentane, dibromodiethyl ether, di($\beta$-chloroethyl)methylamine·HCl, di($\beta$-chloroethyl)amine·HCl, di($\beta$-chloroethyl)aniline·HCl, 1,4-dichlorobutane, and di($\beta$-chloroethyl) $\beta$-hydroxyethylamine·HCl are used in place of the ethyl iodide in the above example, there are obtained the corresponding 2-methyl-3-N-substituted - aminomethyl - 5 - methoxy indoles and 2-methyl-3-N-cyclic-aminomethyl-5-methoxy indoles.

EXAMPLE 9

1-p-chlorobenzoyl-2-methyl-3-N-ethyliminomethyl-5-methoxy indole

A solution of 0.21 mole of 2-methyl-3-N-ethyliminomethyl-5-methoxy indole in 30 ml. of dimethylformamide is added to a suspension of 0.22 mole of sodium hydride in 35 ml. of dimethylformamide. After stirring the reaction at room temperature for ½ hour, the mixture is cooled and treated with 0.22 mole of p-chlorobenzoyl chloride. The mixture is stirred at room temperature for 12 hours and subsequently poured into 250 ml. of ice water. The mixture is then extracted with (2× 200 ml.) ether. The combined ether extract is washed with a dilute aqueous solution of potassium bicarbonate followed by (3× 100 ml.) water. The ether layer is dried over sodium sulfate and concentrated in vacuo to give 1-p-chlorobenzoyl-2-methyl-3-N-ethyliminomethyl-5-methoxy indole.

When the acylating agents obtained from Example 2 are used in place of p-chlorobenzoyl chloride in the above example, there are obtained the corresponding 1-acyl-2-methyl-3-N-ethyliminomethyl-5-methoxy indoles.

Similarly, when the 3-ethyliminomethyl indoles, 3-ethylimino substituted methyl indoles, and the 3-N-substituted iminomethyl indoles obtained from Example 5 are used in place of 2-methyl-3-N-ethyliminomethyl-5-methoxy indole in the above example, there are obtained the corresponding 1-p-chlorobenzoyl-3-N-ethyliminomethyl indoles, 1-p-chlorobenzoyl-3-N-ethylimino substituted methyl indoles, and 1-p-chlorobenzoyl-3-N-substituted iminomethyl indoles respectively.

(Those compounds which contain groups which are affected by the above acylation are not used or must be protected prior to acylation. Examples of such groups are those containing active hydrogens, amino, carboxyl, and the like.)

EXAMPLE 10

2-methyl-3-(2′-methyl-2′-nitrovinyl)-5-methoxy indole

A solution of 0.05 mole of 2-methyl-3-aldehyde-5-methoxy indole, 0.01 mole of ammonium acetate, and 250 ml. of nitroethane is stirred for 1 hour at 100° C. The reaction mixture is then cooled and 300 ml. of water are added. The 2-methyl-3-(2′-methyl-2′-nitrovinyl) - 5 - methoxy indole which crystallizes out is filtered off and washed with (3× 100 ml.) water. The indole is then recrystallized from chloroformethanol.

When the 3-aldehyde substituted indoles obtained from Example 3 are used in place of 2-methyl-3-aldehyde-5-methoxy indole in the above example, there are obtained the corresponding 3-(2′-methyl-2′-nitrovinyl) substituted indoles.

Similarly, when nitromethane, 1-nitropropane, 3-chloro-1-nitropropane, 2-methoxynitroethane, phenyl-methoxynitromethane, 2-hydroxypropylnitromethane, phenylnitromethane, and 2-benzyloxypropylnitromethane are used in place of nitroethane in the above example, there are obtained the corresponding 2-methyl-3-(2′-substituted-2′-nitrovinyl)-5-methoxy indoles.

Similarly, when the 3-keto substituted indoles obtained from Example 4 are used in the above example in place of 2-methyl-3-aldehyde-5-methoxy indole, there are obtained the corresponding 3 -(1' - substituted - 2' - methyl-2'-nitrovinyl) substituted indoles.

EXAMPLE 11

α-Methyl-(2-methyl-5-methoxy-3-indolyl)-aminoethane

A solution of 2-methyl-3-(2'-methyl-2'-nitrovinyl)-5-methoxy indole in 150 ml. of tetrahydrofuran is added dropwise over a period of 15 minutes to a solution heated to 50° C. of 0.03 mole of lithium aluminum hydride in 250 ml. of tetrahydrofuran and the mixture stirred for 10 hours at 50° C. The solution is cooled in an ice bath and then treated with 250 ml. of methanol and 100 ml. of saturated aqueous sodium sulfate. The mixture is then filtered, washed with chloroform, and then evaporated to dryness. The resultant residue is distributed between ether and aqueous tartaric acid solution. The acid solution is then adjusted to alkalinity with dilute aqueous sodium hydroxide while cooling with ice. The solution is then quickly shaken with ether (2× 100 ml.) and the combined ether extracts are dried over sodium sulfate and the ether evaporated off to yield α-methyl-(2-methyl-5-methoxy-3-indolyl)-aminoethane.

When the 3-(2'-methyl-2'-nitrovinyl) substituted indoles, 2-methyl-3-(2'-substituted-2'-nitrovinyl)-5-methoxy indoles, and 3-(1'-substituted-2'-methyl-2'-nitrovinyl) substituted indoles obtained from Example 10 are used in place of 2-methyl-3-(2'-methyl-2'-nitrovinyl)-5-methoxy indole in the above example, there are obtained the corresponding α-methyl-3-(aminoethyl) substituted indoles, α-substituted - (2-methyl-5 - methoxy-3-indolyl) - aminoethane, and α,β-disubstituted - (substituted - 3-indolyl)-aminoethanes respectively.

(Those compounds containing groups which will be affected by the above reduction must be removed or protected prior to the reduction. Such groups are nitro, cyano, alkenyl, and the like.)

EXAMPLE 12

1-p-chlorobenzoyl-2-methyl-3-(2'-methyl-2'-nitrovinyl)-5-methoxy indole

A solution of 0.03 mole of 2-methyl-3-(2'-methyl-2'-nitrovinyl)-5-methoxy indole in 30 ml. of dimethylformamide is added dropwise to a cold suspension of 0.33 mole of sodium hydride and 35 ml. of dimethylformamide. After the mixture is stirred at room temperature for 30 minutes, 0.33 mole of p-chlorobenzoyl chloride is added. The reaction mixture is then stirred at room temperature for 12 hours and the mixture subsequently poured into 300 ml. of ice water. The aqueous mixture is then extracted with (2× 300 ml.) ether. The combined ether extract is then washed with 75 ml. of aqueous potassium bicarbonate, followed by 2× 125 ml. portions of water. The ether layer is then dried over sodium sulfate and concentrated in vacuo to yield 1 - p - chlorobenzoyl - 2 - methyl - 3 - (2'-methyl-2'-nitrovinyl)-5-methoxy indole.

When the corresponding 3-(2'methyl-2'-nitrovinyl) substituted indoles, 3-(1'-substituted-2'-methyl-2'-nitrovinyl) substituted indoles, and 2-methyl-3-(2'-substituted-2'-nitrovinyl)-5-methoxy indoles are used in place of 2-methyl-3-(2'-methyl-2'-nitrovinyl)-5-methoxy indole in the above example, there are obtained the corresponding 1-p-chlorobenzoyl-3-(2'-methyl-2'-nitrovinyl) substituted indoles, 1 - p - chlorobenzoyl-3-(1'-substituted-2'-methyl-2'-nitrovinyl) substituted indoles, and 1-p-chlorobenzoyl-2-methyl-3-(2'-substituted-2'-nitrovinyl)-5-methoxy indoles respectively.

Similarly, when the acylating agents obtained from Example 2 are used in place of the p-chlorobenzoyl chloride in the above example, there are obtained the corresponding 1-acyl-2-methyl-3-(2'-methyl-2'-nitrovinyl)-5-methoxy indoles.

(Those compounds which contain groups which will be affected by the above acylation are either protected or removed prior to acylation. Such groups are those containing an active hydrogen such as amino, carboxyl, and the like.)

EXAMPLE 13

α-Methyl-(2-methyl-5-methoxy-3-indolyl)-N-ethyl-aminoethane

A mixture of 0.10 mole of α-methyl-(2-methyl-5-methoxy-3-indolyl)-aminoethane, 0.11 mole of ethyl iodide, and 0.15 mole of sodium bicarbonate in 50 ml. of anhydrous 1,2-dimethoxyethane is heated on a steam bath under nitrogen for 3 hours. The mixture is then filtered and the solvent removed in vacuo. The residue thus obtained is chromatographed on 250 grams of a neutral alumina column and eluted with ether-petroleum ether (v./v. 50–100%) to obtain α-methyl-(2-methyl-5-methoxy-3-indolyl)-N-ethylaminoethane.

Similarly, when α-methyl-3-(aminoethyl) substituted indoles, α-substituted-(2-methyl - 5 - methoxy-3-indolyl)-aminoethanes, and α,β-disubstituted-(substituted-3-indolyl)-aminoethanes obtained from Example 11 are used in place of α-methyl-(2-methyl-5-methoxy-3-indolyl)-aminoethane in the above example, there are obtained the corresponding α-methyl-3-(N-ethylaminoethyl) substituted indoles, α-substituted-(2-methyl-5-methoxy-3-indolyl)-N-ethylaminoethane, and α,β-disubstituted-(substituted-3-indolyl)-N-ethylaminoethanes respectively.

Similarly, when p-methoxybenzyl chloride, benzyloxyethyl iodide, 3-methoxypropyl iodide, p-methoxyphenylpropyl iodide, acetyl iodide, cyclopropylmethyl bromide, cyclobutylmethyl bromide, tetrahydrofurfuryl iodide, cyclohexyl iodide, 1,5-diiodopentane, dibromodiethyl ether, di(β-chloroethyl)-methylamine hydrochloride, di-(β-chloroethyl)-amine hydrochloride, di-(β-chloroethyl)-aniline hydrochloride, 1,4-dichlorobutane, and di-(β-chloroethyl)-β-hydroxyethylamine hydrochloride are used in place of ethyl iodide in the above example, there are obtained the corresponding α-methyl-(2-methyl-5-methoxy-3-indolyl)-N-substituted aminoethanes and α-methyl-(2-methyl-5-methoxy-3-indolyl)-N,N-cyclicaminoethanes respectively.

EXAMPLE 14

α-Methyl-2-methyl-5-methoxy-3-indolyl acetyl chloride

A solution of 2.8 grams of α-methyl-2-methyl-5-methoxy-3-indolyl acetic acid in 50 ml. of dry ether is treated at 0° C. with 2.7 grams of phosphorus pentachloride with stirring under nitrogen. After the reaction has continued for 3 hours, the solution is diluted with petroleum ether to precipitate the acid chloride. The mixture is filtered and the cake washed with (1:10) ether-petroleum ether and dried in vacuo.

When 2-methyl-4-methyl-5-methyl-3-indolyl acetic acid,
α-ethyl-2-methyl-7-methyl-3-indolyl acetic acid,
α-methyl-2-(prop-2-en)-4-benzyloxy-3-indolyl acetic acid,
α-chloroethyl-2-methyl-5-benzyloxy-3-indolyl acetic acid,
α-ethoxy-2-methyl-4-ethoxy-5-methoxy-3-indolyl acetic acid,
α-bromopropyl-2-methyl-4-nitro-5-methoxy-3-indolyl acetic acid,
α-benzyloxy-2-methyl-5-nitro-3-indolyl acetic acid,
2-methyl-4-benzylideneamino-5-ethoxy-3-indolyl acetic acid,
2-methyl-5-benzylideneamino-3-indolyl acetic acid,
2-methyl-5-benzylideneaminoethyl-5-methoxy-3-indolyl acetic acid,
4-benzylideneaminoethyl-5-methoxy-3-indolyl acetic acid,
2-methyl-5-benzylideneaminoethyl-3-indolyl acetic acid,
α-benzyloxyethyl-2-methyl-4-di(ethyl)amino-3-indolyl acetic acid,
α-benzyloxymethyl-2-methyl-5-di(propyl)amino-3-indolyl acetic acid,
α-(prop-2-en)-2-methyl-4-acetamido-5-propoxy-3-indolyl acetic acid, α-(but-3-yn)-2-methyl-5-acetamido-3-indolyl acetic acid,
α-phenyl-4-acetyl-5-methyl-3-indolyl acetic acid,
2-methyl-4-p-methoxyphenyl-5-acetyl-3-indolyl acetic acid,
2-methyl-4-di(benzyloxyethyl)amino-3-indolyl acetic acid,
2-methyl-5-di(benzyloxypropyl)amino-3-indolyl acetic acid,
2-methyl-4-(1'-pyrrolidino)-5-methyl-3-indolyl acetic acid,
2-methyl-5-(1'-pyrrolidino)-3-indolyl acetic acid,
2-propyl-4-(4'-methyl-1'-piperazinyl)-3-indolyl acetic acid,
2-propyl-5-(4'-methyl-1'-piperazinyl)-3-indolyl acetic acid,
4-(4'-morpholinyl)-3-indolyl acetic acid,
2-methyl-5-(4'-morpholinyl)-3-indolyl acetic acid,
2-methyl-4-cyano-5-methoxy-3-indolyl acetic acid,
2-methyl-4-methyl-5-cyano-3-indolyl acetic acid,
2-methyl-4-trifluoromethyl-5-methoxy-3-indolyl acetic acid,
2-methyl-5-trifluoromethyl-3-indolyl acetic acid,
2-methyl-4-chloro-5-methoxy-3-indolyl acetic acid,
4-methyl-5-chloro-3-indolyl acetic acid,
4-bromo-3-indolyl acetic acid,
2-propyl-5-bromo-3-indolyl acetic acid,
2-methyl-4-fluoro-3-indolyl acetic acid,
2-methyl-5-fluoro-3-indolyl acetic acid,
2-methyl-4-dimethylsulfamyl-3-indolyl acetic acid,
5-dimethylsulfamyl-3-indolyl acetic acid,
2-methyl-4-benzylthio-5-methoxy-3-indolyl acetic acid,
2-methyl-4-methyl-5-benzylthio-3-indolyl acetic acid,
2-methyl-7-chloro-3-indolyl acetic acid,
7-chloro-3-indolyl acetic acid,
7-methyl-3-indolyl acetic acid,
6-fluoro-3-indolyl acetic acid,
2-methyl-5-benzylthio-3-indolyl acetic acid,
2-methyl-4-benzyloxy-5-methyl-3-indolyl acetic acid,
2-methyl-5-benzyloxy-3-indolyl acetic acid,
2-methyl-4-p-ethylbenzyloxy-3-indolyl acetic acid,
2-methyl-5-p-ethylbenzyloxy-3-indolyl acetic acid,
2-methyl-4-p-bromobenzyloxy-5-methyl-3-indolyl acetic acid,
2-methyl-5-p-chlorobenzyloxy-3-indolyl acetic acid,
4-allyl-3-indolyl acetic acid,
5-allyl-3-indolyl acetic acid,
4-(prop-2'-enoxy)-5-methoxy-3-indolyl acetic acid,
2-methyl-5-(prop-2'-enoxy)-3-indolyl acetic acid,
2-methyl-4-(1'-azacyclopropyl)-3-indolyl acetic acid,
5-(1'-azacyclopropyl)-3-indolyl acetic acid,
4-cyclopropylmethoxymethyloxy-3-indolyl acetic acid,
5-cyclopropylmethoxymethyloxy-3-indolyl acetic acid,
2-methyl-4-cyclobutylethoxymethyloxy-5-methyl-3-indolyl acetic acid,
2-methyl-4-methyl-5-cyclobutylethoxymethyloxy-3-indolyl acetic acid,
2-methyl-4-dimethylsulfamyl-5-methoxy-3-indolyl acetic acid,
2-methyl-5-dimethylsulfamyl-3-indolyl acetic acid,
2-methyl-4,5-methylenedioxy-3-indolyl acetic acid,
2-methyl-5,6-methylenedioxy-3-indolyl acetic acid,
2-methyl-5,6-diethoxy-3-indolyl acetic acid,
2-methyl-5,6-dichloro-3-indolyl acetic acid,
2-methyl-5-dimethylamino-3-indolyl acetic acid, and
2-methyl-4,5,6-tribenzyloxy-3-indolyl acetic acid are used in place of
2-methyl-5-methoxy-3-indolyl acetic acid in the above example, there are obtained
2-methyl-4-methyl-5-methyl-3-indolyl acetyl chloride,
α-ethyl-2-methyl-7-methyl-3-indolyl acetyl chloride,
α-methyl-2-(prop-2-en)-4-benzyloxy-3-indolyl acetyl chloride,
α-chloroethyl-2-methyl-5-benzyloxy-3-indolyl acetyl chloride,
α-ethoxy-2-methyl-4-ethoxy-5-methoxy-3-indolyl acetyl chloride,
α-bromopropyl-2-methyl-4-nitro-5-methoxy-3-indolyl acetyl chloride,
α-benzyloxy-2-methyl-5-nitro-3-indolyl acetyl chloride,
2-methyl-4-benzylideneamino-5-ethoxy-3-indolyl acetyl chloride,
2-methyl-5-benzylideneamino-3-indolyl acetyl chloride,
4-benzylideneaminoethyl-5-methoxy-3-indolyl acetyl chloride,
2-methyl-5-benzylideneaminoethyl-3-indolyl acetyl chloride,
α-benzyloxyethyl-2-methyl-4-di(ethyl)amino-3-indolyl acetyl chloride,
α-benzyloxymethyl-2-methyl-5-di(propyl)amino-3-indolyl acetyl chloride,
α-(prop-2-en)-2-methyl-4-acetamido-5-propoxy-3-indolyl acetyl chloride,
α-(but-3-yn)-2-methyl-5-acetamido-3-indolyl acetyl chloride,
α-phenyl-4-acetyl-5-methyl-3-indolyl acetyl chloride,
2-methyl-4-p-methoxyphenyl-5-acetyl-3-indolyl acetyl chloride,
2-methyl-4-di(benzyloxyethyl)amino-3-indolyl acetyl chloride,
2-methyl-5-di(benzyloxypropyl)amino-3-indolyl acetyl chloride,
2-methyl-4-(1'-pyrrolidino)-5-methyl-3-indolyl acetyl chloride,
2-methyl-5-(1'-pyrrolidino)-3-indolyl acetyl chloride,
2-propyl-4-(4'-methyl-1'-piperazinyl)-3-indolyl acetyl chloride,
2-propyl-5-(4'-methyl-1'-piperazinyl)-3-indolyl acetyl chloride,
4-(4'-morpholinyl)-3-indolyl acetyl chloride,
2-methyl-5-(4'-morpholinyl)-3-indolyl acetyl chloride,
2-methyl-4-cyano-5-methoxy-3-indolyl acetyl chloride,
2-methyl-4-methyl-5-cyano-3-indolyl acetyl chloride,
2-methyl-4-trifluoromethyl-5-methoxy-3-indolyl acetyl chloride,
2-methyl-5-trifluoromethyl-3-indolyl acetyl chloride,
2-methyl-4-chloro-5-methoxy-3-indolyl acetyl chloride,
4-methyl-5-chloro-3-indolyl acetyl chloride,
4-bromo-3-indolyl acetyl chloride,
2-propyl-5-bromo-3-indolyl acetyl chloride,
2-methyl-4-fluoro-3-indolyl acetyl chloride,
2-methyl-5-fluoro-3-indolyl acetyl chloride,
2-methyl-4-dimethylsulfamyl-3-indolyl acetyl chloride,
5-dimethylsulfamyl-3-indolyl acetyl chloride,
2-methyl-4-benzylthio-5-methoxy-3-indolyl acetyl chloride,
2-methyl-4-methyl-5-benzylthio-3-indolyl acetyl chloride,
2-methyl-7-chloro-3-indolyl acetyl chloride,
7-chloro-3-indolyl acetyl chloride,
7-methyl-3-indolyl acetyl chloride,
6-fluoro-3-indolyl acetyl chloride,
2-methyl-5-benzylthio-3-indolyl acetyl chloride,
2-methyl-4-benzyloxy-5-methyl-3-indolyl acetyl chloride,
2-methyl-5-benzyloxy-3-indolyl acetyl chloride,
2-methyl-4-p-ethylbenzyloxy-3-indolyl acetyl chloride,
2-methyl-5-p-ethylbenzyloxy-3-indolyl acetyl chloride,
2-methyl-4-p-bromobenzyloxy-5-methyl-3-indolyl acetyl chloride,
2-methyl-5-p-chlorobenzyloxy-3-indolyl acetyl chloride,
4-allyl-3-indolyl acetyl chloride,
5-allyl-3-indolyl acetyl chloride,
4-(prop-2'-enoxy)-5-methoxy-3-indolyl acetyl chloride,
2-methyl-5-(prop-2'-enoxy)-3-indolyl acetyl chloride,
2-methyl-4-(1'-azacyclopropyl)-3-indolyl acetyl chloride,
5-(1'-azacyclopropyl)-3-indolyl acetyl chloride,
4-cyclopropylmethoxymethyloxy-3-indolyl acetyl chloride,
5-cyclopropylmethoxymethyloxy-3-indolyl acetyl chloride,
2-methyl-4-cyclobutylethoxymethyloxy-5-methyl-3-indolyl acetyl chloride,
2-methyl-4-methyl-5-cyclobutylethoxymethyloxy-3-indolyl acetyl chloride,
2-methyl-4-dimethylsulfamyl-5-methoxy-3-indolyl acetyl chloride,
2-methyl-5-dimethylsulfamyl-3-indolyl acetyl chloride,
2-methyl-4,5-methylenedioxy-3-indolyl acetyl chloride, 2-methyl-5,6-methylenedioxy-3-indolyl acetyl chloride,
2-methyl-5,6-diethoxy-3-indolyl acetyl chloride,
2-methyl-5,6-dichloro-3-indolyl acetyl chloride,
2-methyl-5-dimethylamino-3-indolyl acetyl chloride, and
2-methyl-4,5,6-tribenzyloxy-3-indolyl acetyl chloride respectively.

EXAMPLE 15

1-(2-methyl-5-methoxy-3-indolyl)-1-methyl butanone

To a solution of 0.05 mole of diethylcadmium in 50 ml. of benzene (prepared according to organic synthesis Coll., volume 3, page 601) is added 0.04 mole of α-methyl-2-methyl-5-methoxy-3-indolyl acetyl chloride in 15 ml. of benzene with stirring under nitrogen. The mixture is heated at reflux for 1½ hours, cooled, and poured into 100 ml. of iced water containing a slight excess of sulfuric acid. The benzene layer is separated and the aqueous layer is extracted with (2× 50 ml.) benzene. The combined extract is washed with water, 5% sodium carbonate, and water successively and dried over sodium sulfate. After evaporation of the solvent in vacuo, the crude product is chromatographed on a column of acid-washed alumina using ether-petroleum ether (v./v. 20–50%) as eluent.

When the α-substituted-substituted - 3 - indolyl acetyl chlorides obtained from Example 14 are used in place of α-methyl-2-methyl-5-methoxy-3-indolyl acetyl chloride in the above example, there are obtained the corresponding substituted-1-(3-indolyl) butanones.

Similarly, when di(ethoxyethyl)cadmium, di(benzyloxyethyl)cadmium, di(3 - benzyloxypropyl)cadmium, di(prop-2-en)cadmium, diphenylcadmium, and di(but-3-yn)cadmium are used in the above example in place of diethylcadmium, there are obtained the corresponding 2-methyl - 5 - methoxy - 3 - indolyl-α-substituted-β-methyl ketones.

(The dibenzyloxyalkyl compounds obtained from above are reduced to the corresponding hydroxyalkyl compounds, which are subsequently converted to the haloalkyl compounds.)

EXAMPLE 16

2-methyl-5-methoxy-3-indolyl-α-ethyl-β-methyl-N-ethyliminoethane

A mixture of 0.02 mole of 1-(2-methyl-5-methoxy-3-indolyl)-1-methyl butanone and 250 ml. of ethylamine is stirred at room temperature for 1 hour. The solution is concentrated to dryness to yield crude 2-methyl-5-methoxy-3-indolyl-α-ethyl-β-methyl-N-ethyliminoethane.

When the 3-indolyl-α-ethyl-β-substituted ketones and the 2 - methyl-5-methoxy-3-indolyl-α-substituted-β-methyl ketones obtained from Example 15 are used in place of 1-(2-methyl-5-methoxy-3-indolyl)-1-methyl butanone in the above example, there are obtained the corresponding 3-indolyl-α-ethyl-β-substituted-N-ethyliminoethanes and 2-methyl - 5 - methoxy-3-indolyl-α-substituted-β-methyl-N-ethyliminoethanes respectively.

EXAMPLE 17

1-p-chlorobenzoyl-2-methyl-5-methoxy-3-indolyl-α-ethyl-β-methyl-N-diethyliminoethane A solution of 0.021 mole of 2-methyl-5-methoxy-3-indolyl-α-ethyl-β-methyl-N-diethyliminoethane in 20 ml. of dimethylformamide is added dropwise to a cold suspension of 1.0 gram (0.022 mole) of sodium hydride (52% dispersion in mineral oil) and 25 ml. of dimethylformamide. The mixture is stirred at room temperature for 20 minutes, cooled, and treated with (0.0222 mole) of p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to give 1-p-chlorobenzoyl - 2 - methyl-5-methoxy-3-indolyl-α-ethyl-β-methyl-N-diethyliminoethane.

When the acylating agents obtained from Example 2 are used in place of p-chlorobenzoyl chloride in the above example, there are obtained the corresponding 1-acyl-2-methyl - 5-methoxy-3-indolyl-α-ethyl-β-methyl-N-diethyliminoethanes.

Similarly, when the substituted 3 - indolyl-α-ethyl-β-methyl-N-diethyliminoethanes and the 2-methyl-5 - methoxy-3-indolyl-α,β-substituted-N-diethyliminoethanes obtained from Example 16 are used in place of 2-methyl-5-methoxy - 3 - indolyl - α - ethyl-β-methyl-N-diethyliminoethane in the above example, there are obtained the corresponding 1 - p-chlorobenzoyl-substituted-3-indolyl-α,β-disubstituted-N-disubstituted-iminoethanes.

(Those compounds which contain groups which are affected by the acylation are either protected or removed prior to acylation. Such compounds are those with groups containing an active hydrogen. Such groups are amino, carboxyl, and the like. This is accomplished by using a benzylalkylamino or dibenzylamino substituent on the ring and after acylation, reducing these groups to obtain the corresponding alkylamino or amino group. The amino group may be converted to the hydroxy group, which may then be converted to the halogeno group by known means.)

EXAMPLE 18

2-methyl-5-methoxy-3-indolyl-α-methyl-β-methylethyl alcohol

To a solution of 0.05 mole of 3-(2-methyl-5-methoxy-3-indolyl) butanone in 100 ml. isopropanol is added dropwise a solution of 0.02 mole sodium borohydride in 20 ml. isopropanol with stirring at 0–5° C. After 2 hours the mixture is poured into iced water and extracted with ether. The ethereal solution is washed with 0.1 N hydrochloric acid, saturated sodium bicarbonate and dried over sodium sulfate. The solution is filtered, concentrated and chromatographed on a column of silical gel using ether-petroleum ether (v./v. 30–100%) as eluent to yield 2-methyl-5-methoxy-3-indolyl-α-methyl-β-methylethyl alcohol.

When the substituted-3-indolyl-α-ethyl-β-substituted ketones and 2-methyl-5-methoxy-3-indolyl-α-substituted-β-methyl ketones obtained from Example 15 are used in place of the 3-(2-methyl-5-methoxy-3-indolyl) butanone in the above example, there are obtained the substituted-3-indolyl-α-ethyl-β-substituted-ethyl alcohols and 2-methyl-5-methoxy-3-indolyl - α - substituted-β-methylethyl alcohols respectively.

(Those compounds which contain groups which are affected by the above reduction must be removed. Such groups are cyano, nitro, and the like.)

EXAMPLE 19

2-methyl-5-methoxy-3-indolyl-α-ethyl-β-methyl ethylbromide

To a solution of 0.03 mole of 2-methyl-5-methoxy-3-indolyl-α-ethyl-β-methyl ethylalcohol in 100 ml. of chloroform is added 0.01 mole of phosphorus tribromide and the reaction mixture stirred for 2 hours at room temperature. The solution is poured into iced water and the chloroform layer is washed with aqueous sodium bicarbonate, water, and dried over sodium sulfate. The solution is then concentrated in vacuo to yield 2-methyl-5-methoxy-3-indolyl-α-ethyl-β- methyl ethylbromide.

When substituted-3-indolyl-α-ethyl-β-substituted ethylalcohols and 2-methyl-5-methoxy-3-indolyl-α-substituted-β-methyl ethylalcohols obtained from Example 18 are used in place of 2-methyl-5-methoxy-3-indolyl-α-ethyl-β-methyl ethylalcohol in the above example, there are obtained the corresponding substituted-3-indolyl - α-ethyl-β-substituted ethylbromides and 2-methyl-5-methoxy - 3 - indolyl-α-substituted-β-methyl ethylbromides respectively.

(In those cases wherein the indole compound contains

EXAMPLE 20

2-methyl-5-methoxy-3-indolyl-α-ethyl-β-methyl ethylcyanide

To a solution of 0.02 mole of 2-methyl-5-methoxy-3-indolyl-α-ethyl-β-methyl ethylbromide in 100 ml. of dimethylsulfoxide is added 0.04 mole of potassium cyanide and the mixture is heated on a steam bath for 2 hours. The solution is poured into iced water and extracted with (3 × 100 ml.) ether. The combined ether extracts are washed with water and dried over sodium sulfate. The ether solution is then concentrated in vacuo and the residue is chromatographed on acid-washed alumina or silica gel to yield 2-methyl-5-methoxy-3-indolyl-α-ethyl-β-methyl ethylcyanide.

When the substituted-3-indolyl - α - ethyl-β-substituted ethylbromides and the 2-methyl-5-methoxy-3-indolyl-α-substituted-β-methyl ethylbromides obtained from Example 19 are used in place of 2-methyl-5-methoxy-3-indolyl-α-ethyl-β-methyl ethylbromide in the above example, there are obtained the corresponding substituted-3-indolyl-α-ethyl-β-substituted ethylcyanides and 2-methyl-5-methoxy-3-indolyl-α-substituted - β - methyl ethylcyanides respectively.

EXAMPLE 21

2-methyl-5-methoxy-3-indolyl-α-ethyl-β-methyl ethylamine·HCl

To a solution of 0.02 mole of 2-methyl-5-methoxy-3-indolyl-α-ethyl-β-methyl ethylcyanide in 100 ml. of ethanol containing 0.04 mole of HCl is added 0.1 gram of platinum oxide and the solution reduced at room temperature under an atmosphere of hydrogen. The reduced solution is then filtered and the filtrate evaporated in vacuo to dryness to yield crude 2-methyl-5-methoxy-3-indolyl-α-ethyl-β-methyl ethylamine hydrochloride.

When the substituted-3-indolyl - α - ethyl-β-substituted ethylcyanides and 2-methyl-5-methoxy - 3 - indolyl-α-substituted-β-methyl ethylcyanides obtained from Example 20 are used in place of 2-methyl-5-methoxy-3-indolyl-α-ethyl-β-methyl ethylcyanide in the above example, there are obtained the corresponding substituted-3-indolyl-α-ethyl-β-substituted ethylamines and 2-methyl-5-methoxy-3-indolyl-α-substituted-β-methyl ethylamines respectively.

(Those groups on the indole compound which are susceptible to this reduction must be eliminated. Such groups may be represented as cyano, nitro, and the like.)

EXAMPLE 22

2-methyl-5-methoxy-3-indolyl-α-ethyl-β-methyl benzylideneaminoethane

A solution of 0.02 mole of 2-methyl-5-methoxy-3-indolyl-α-ethyl-β-methyl aminoethane and 0.02 mole of benzaldehyde in 200 ml. of benzene is refluxed for 1 hour. The benzene solution is then distilled until water no longer comes off. At this point, the solution is concentrated in vacuo. The concentrate is then filtered and the cake washed with cold (2 × 25 ml.) ethanol. The cake is then dried in vacuo to yield 2-methyl-5-methoxy-3-indolyl-α-ethyl-β-methyl benzylideneaminoethane.

When the substituted-3-indolyl-α-ethyl-β-substituted ethylamines and 2-methyl-5-methoxy-3-indolyl-α-substituted-β-methyl ethylamines obtained from Example 21 are used in place of the 2-methyl-5-methoxy-3-indolyl-α-ethyl-β-methyl aminoethane in the above example, there are obtained the corresponding substituted-3-indolyl-α-ethyl-β-substituted benzylideneaminoethanes and 2-methyl-5-methoxy-3-indolyl - α - substituted - β - methyl benzylideneaminoethanes respectively.

EXAMPLE 23

2-methyl-5-methoxy-3-indolyl-α-ethyl-β-methyl-N-ethylaminoethane

A mixture of 0.02 mole of 2-methyl-5-methoxy-3-indolyl-α-ethyl-β-methyl ethylamine, 0.03 mole of sodium bicarbonate, and 0.022 mole of ethyl iodide in 50 ml. of anhydrous 1,2-dimethoxyethane is heated on a steam bath under nitrogen for 3 hours. The mixture is then filtered and the filtrate concentrated in vacuo. The residue thus obtained is chromatographed on 300 grams of a neutral alumina column and eluted with ether-petroleum ether (v./v. 20–100%) to obtain 2-methyl-5-methoxy-3-indolyl-α-ethyl-β-methyl-N-ethylaminoethane.

When the substituted - 3 - indolyl-α-ethyl-β-substituted ethylamines and 2-methyl-5-methoxy-3-indolyl-α-substituted-β-methyl ethylamines obtained from Example 21 are used in place of 2-methyl-5-methoxy-3-indolyl-α-ethyl-β-methyl ethylamine in the above example, there are obtained the corresponding substituted-3-indolyl-α-ethyl-β-substituted-N-ethylaminoethanes and 2-methyl-5-methoxy-3-indolyl-α-substituted-β-methyl-N-ethylaminoethanes respectively.

Similarly, when 1-iodo-3-chloropropane, 3-benzyloxypropyl bromide, 3-bromopropanol, allyl bromide, 1-bromide-prop-3-yne, 3-methoxypropyl bromide, cyclopropylmethyl bromide, cyclobutylmethyl bromide, 1,5-diiodopentane, dibromodiethyl ether, di(β-chloroethyl)methylamine·HCl, di(β-chloroethyl)amine·HCl, di(β-chloroethyl)aniline·HCl, 1,4-dichlorobutane, and di(β-chloroethyl)β-hydroxyethylamine·HCl are used in place of the ethyl iodide in the above example, there are obtained the corresponding 2 - methyl - 5-methoxy-3-indolyl-α-ethyl-β-methyl-N-substituted aminoethanes.

EXAMPLE 24

1 - p - chlorobenzyl - 2 - methyl - 5 - methoxy - 3 - indolyl-α-ethyl - β - methyl ethylcyanide A solution of 0.042 mole of 2-methyl-5-methoxy-3-indolyl-α-ethyl-β-methyl ethylcyanide in 40 ml. of dimethylformamide is added dropwise to a cold suspension of 0.044 mole of sodium hydride and 50 ml. of dimethylformamide. This mixture is stirred at room temperature for ½ hour, cooled, and treated with 0.044 mole of p-chlorobenzoyl chloride and the reaction mixture stirred at room temperature for 16 hours. At the end of this reaction time, the mixture is poured into 500 ml. of ice water. The aqueous mixture is then extracted with (4 × 150 ml.) ether, and the ether extracts combined. The ether solution is then washed with 100 ml. of potassium bicarbonate solution and 4 × 75 ml. portions of water. The ether solution is then dried over sodium sulfate and concentrated in vacuo to yield 1-p-chlorobenzoyl-2-methyl - 5 - methoxy - 3 - indolyl-α-ethyl-β-methyl ethylcyanide.

When the acylating agents obtained from Example 2 are used in place of the p-chlorobenzoyl chloride in the above example, there are obtained the corresponding 1-acyl-2-methyl-5-methoxy-3-indolyl-α-ethyl-β-methyl ethylcyanides.

Similarly, when the substituted-3-indolyl-α-ethyl-β-substituted ethylcyanides and 2-methyl-5-methoxy-3-indolyl-α-substituted-β-methyl ethylcyanides obtained from Example 20 are used in place of 2-methyl-5-methoxy-3-indolyl-α-ethyl-β-methyl ethylcyanide in the above example, there are obtained the corresponding 1-p-chlorobenzoyl - substituted-3-indolyl-α-ethyl-β-substituted ethylcyanides and 1 - p-chlorobenzoyl - 2-methyl-5-methoxy-3-indolyl-α-substituted-β-methyl ethylcyanides respectively.

(The compounds which contain groups which will be affected by acylation must be either protected or removed prior to acylation. Such groups are those which contain an active hydrogen, such as amino, carboxyl, and the like.

EXAMPLE 25

2 - methyl - 5 - methoxy - 3 - indolyl - α - ethyl-β-methyl-propionaldehyde

A solution of 0.05 mole of 2-methyl - 5 - methoxy-3-indolyl-α-ethyl-β-methyl ethylcyanide and 0.1 mole of sodium hypophosphite in 40 ml. of 75% acetic acid is stirred with 2.0 grams of Raney nickel at 45° C. for 3 hours. The mixture is then filtered, the catalyst extracted with a small portion of warm aqueous alcohol, and the extract added to the filtrate. The filtrate is then diluted with 50 ml. of water and extracted with (3× 25 ml.) ether. The combined ether extracts are washed with (2× 15 ml.) water, dried over sodium sulfate, and concentrated to yield 2-methyl-5-methoxy-3-indolyl-α-ethyl-β-methyl propionaldehyde.

When the 3-indolyl-α-ethyl-β-substituted ethylcyanides and 2-methyl-5-methoxy-3-indolyl-α-substituted-β-methyl ethylcyanides obtained from Example 20 are used in place of 2 - methyl-5-methoxy-3-indolyl-α-ethyl-β-methyl ethylcyanide in the above example, there are obtained the corresponding propionaldehydes.

(The compounds which contain groups that will be affected by the above reduction are not used.)

EXAMPLE 26

N-ethyl-2-methyl - 5 - methoxy - 3 - indolyl - α - ethyl-β-methyl propylimine

A mixture of 0.03 mole of 2 - methyl - 5 - methoxy - 3-indolyl-α-ethyl-β-methyl propionaldehyde in 200 ml. of ethylamine is stirred at room temperature for 2 hours. The solution is then concentrated in vacuo to yield crude N-ethyl-2-methyl-5-methoxy-3-indolyl-α-ethyl - β - methyl propylimine.

When the substituted - 3 - indolyl-α-ethyl-β-substituted propionaldehydes and 2 - methyl - 5-methoxy-3-indolyl-α-substituted-β-methyl propionaldehydes obtained from Example 25 are used in place of 2-methyl-5-methoxy-3-indolyl - α - ethyl-β-methyl propionaldehyde in the above example, there are obtained the corresponding N-ethylimines.

EXAMPLE 27

N-ethyl-1-p-chlorobenzoyl-2-methyl-5-methoxy-3-indolyl-α-ethyl-β-methyl propylamine A solution of 0.042 mole of N-ethyl-2-methyl-5-methoxy-3-indolyl-α-ethyl-β-methyl propylimine in 40 ml. of dimethylformamide is added dropwise to a cold suspension of 2.0 grams of sodium hydride and 50 ml. of dimethylformamide. The mixture is stirred at room temperature for 20 minutes, cooled, and treated with (0.0444 mole) p-chlorobenzoyl chloride. The reaction mixture is stirred at room temperature for about 16 hours and poured into 500 ml. of ice water. The aqueous mixture is extracted with four 200 ml. portions of ether. The ether extract is washed with 125 ml. of potassium bicarbonate solution and four 75 ml. portions of water. The ether layer is dried and concentrated at reduced pressure to give N-ethyl-1-p-chlorobenzoyl-2-methyl-5-methoxy-3-indolyl-α-ethyl-β-methyl propylimine.

When using the acylating agents obtained from Example 2 in place of p-chlorobenzoyl chloride in the above example, there are obtained the corresponding N-ethyl-1-acyl - 2 - methyl - 5-methoxy-3-indolyl-α-ethyl-β-methyl propylimines.

Similarly, when using the N-ethyl-substituted-3-indolyl-α-ethyl-β-substituted propylimines and N-ethyl-2-methyl-5 - methoxy-3-indolyl-α-substituted-β-methyl propylimines obtained from Example 26 in place of N-ethyl-2-methyl-5-methoxy-3-indolyl-α-ethyl-β-methyl propylimine in the above example, there are obtained the corresponding 1-p-chlorobenzoyl compounds.

(Those compounds which contain groups that will be affected by the above acylation must be either protected or removed prior to acylation. Such groups may be represented as amino, carboxyl, and the like.)

EXAMPLE 28

2-methyl-5-methoxy-3-indolyl-α-ethyl-β-methyl-nitro-prop-1-ene

A solution of 0.1 mole of 2-methyl-5-methoxy-3-indolyl-α-ethyl-β-methyl propionaldehyde, 0.02 mole of ammonium acetate, and 250 ml. of liquid nitromethane in a sealed vessel is stirred for 1 hour at 100° C. The reaction mixture is then cooled and 400 ml. of water are added. The 2 - methyl - 5 - methoxy-3-indolyl-α-ethyl-β-methyl-nitro-prop-1-ene, which crystallizes out, is filtered off and washed with (4× 75 ml.) water. The indole is then recrystallized from chloroform-ethanol.

When the substituted - 3-indolyl-α-ethyl-β-substituted propionaldehydes and 2-methyl-5-methoxy-3-indolyl-α-substituted-β-methyl propionaldehydes obtained from Example 25 are used in place of 2-methyl-5-methoxy-3-indolyl-α-ethyl-β-methyl propionaldehyde in the above example, there are obtained the corresponding nitropropines.

EXAMPLE 29

1-p-chlorobenzoyl-2-methyl-5-methoxy-3-indolyl-α-ethyl-β-methyl-nitro-prop-1-ene A solution of 0.021 mole of 2 methyl-5-methoxy-3-indolyl-α-ethyl-β-methyl-nitro-prop-1-ene in 20 ml. of dimethylformamide is added dropwise to a cold suspension of 1.0 gram (0.022 mole) of sodium hydride (52% dispersion in mineral oil) and 25 ml. of dimethylformamide. The mixture is stirred at room temperature for 20 minutes, cooled, and treated with (0.0222 mole) of p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether solution is dried and concentrated at reduced pressure to a residue, which is then chromatographed on a column of silica gel using ether-petroleumether (v./v. 20–50%) as eluent to give 1-p - chlorobenzoyl - 2-methyl-5-methoxy-3-indolyl-α-ethyl-β-methyl-nitro-prop-1-ene.

When the acylating agents obtained from Example 2 are used in place of the p-chlorobenzoyl chloride in the above example, there are obtained the corresponding 1-acyl - 2 - methyl - 5-methoxy-3-indolyl-α-ethyl-β-methyl-nitro-prop-1-enes.

Similarly, when the substituted-3-indolyl-α-ethyl-β-substituted-nitro-prop-1-enes and 2-methyl-5-methoxy-3-indolyl - α-substituted-β-methyl-nitro-prop-1-enes obtained from Example 28 are used in place of the 2-methyl-5-methoxy - 3-indolyl-α-ethyl-β-methyl-nitro-prop-1-ene in the above example, there are obtained the corresponding 1 - p-chlorobenzoyl-substituted-3-indolyl-α-ethyl-β-substituted-nitro-prop-1-enes and 1-p-chlorobenzoyl-2-methyl-5 - methoxy-3-indolyl-α-substituted-β-methyl-nitro-prop-1-enes respectively.

(Those compounds which contain groups that will be affected by the above acylation must be protected or removed prior to acylation. Such groups may be represented as amino, carboxyl, and the like (containing active hydrogens).)

EXAMPLE 30

1-p-chlorobenzoyl-2-methyl-3-benzylideneaminomethyl-5-methoxy indole

A solution of 0.021 mole of 2-methyl-3-benzylideneaminomethyl-5-methoxy indole in 20 ml. of dimethylformamide is added dropwise to a cold suspension of 1.0 gram (0.022 mole) of sodium hydride (52% dispersion in mineral oil) and 25 ml. of dimethylformamide. The mixture is stirred at room temperature for 20 minutes, cooled, and treated with (0.0222 mole) p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to a residue, which is chromatographed on a column of silica gel to give 1-p-chlorobenzoyl - 2 - methyl - 3 - N - benzylideneaminomethyl-5-methoxy indole.

When the 3-N-substituted aminomethyl substituted indoles, 3-diethylaminosubstitutedmethyl substituted indoles, and 2-methyl-3-N,N-substitutedethylaminomethyl-5-methoxy indoles obtained from Examples 6, 7, and 8 respectively are used in place of 2-methyl-3-N-benzylideneaminomethyl-5-methoxy indole in the above example, there are obtained the corresponding 1-p-chlorobenzoyl indoles.

Similarly, when the acylating agents obtained from Example 2 are used in place of p-chlorobenzoyl chloride in the above example, there are obtained the corresponding 1-acyl-2-methyl-3-N-ethylaminomethyl-5-methoxy indoles.

(Those compounds which contain groups that will be affected by the above acylation must either be protected or removed prior to acylation.)

EXAMPLE 31

1-p-chlorobenzoyl-2-methyl-3-aminomethyl-5-methoxy indole hydrochloride

To a solution of 0.01 mole of 1-p-chlorobenzoyl-2-methyl-3-benzylideneaminomethyl-5-methoxy indole in 100 ml. of dioxan is added 0.01 mole of hydrochloric acid in 5 ml. of water. The reaction mixture is stirred for ½ hour at room temperature. The solution is then concentrated in vacuo, diluted with 30 ml. water, and extracted with (2× 50 ml.) ether. The aqueous layer is treated with activated charcoal and then concentrated in vacuo to yield crude 1-p-chlorobenzoyl-2-methyl-3-aminomethyl-5-methoxy indole hydrochloride. The amine hydrochloride is recrystallized from ethanol.

When the 1-p-chlorobenzoyl-3-benzylideneaminomethyl substituted indoles and 1-acyl-2-methyl-3-benzylideneaminomethyl-5-methoxy indoles obtained from Example 30 are used in place of the 1-p-chlorobenzoyl-2-methyl-3-benzylideneaminomethyl-5-methoxy indole in the above example, there are obtained the hydrochlorides of the corresponding 1-p-chlorobenzoyl-3-aminomethyl substituted indoles and 1 - acyl - 2 - methyl-3-aminomethyl-5-methoxy indoles respectively.

EXAMPLE 32

1-p-chlorobenzoyl-2-methyl-3-N,N-dimethylaminomethyl-5-methoxy indole

To a solution of 0.04 mole of 1-p-chlorobenzoyl-2-methyl-5-methoxy indole, 0.044 mole of dimethylamine, and 0.05 mole of acetic acid in 200 ml. of ethanol is added 0.044 mole of 40% formaldehyde and the reaction mixture is refluxed for 5 hours. The solution is then cooled and concentrated in vacuo to ca. 50 ml. The concentrate is poured into water containing 0.05 mole of sodium hydroxide and then extracted with (4× 100 ml.) ether. The combined ether extract is washed with water, dried over sodium sulfate, and evaporated to yield 1-p-chlorobenzoyl - 2 - methyl - 3 - N,N - dimethylaminomethyl-5-methoxy indole.

When the amines from Example 1 are used in place of the dimethylamine in the above example, there are obtained the corresponding 2-methyl-3-N,N-disubstituted-aminomethyl-5-methoxy indoles.

Similarly, when the 1-acyl-2-methyl-5-methoxy indoles obtained from Example 2 are used in place of 1-p-chlorobenzoyl-2-methyl-5-methoxy indole in the above example, there are obtained the corresponding 1-acyl-2-methyl-3-N,N-dimethylaminomethyl-5-methoxy indoles.

EXAMPLE 33

1-p-chlorobenzoyl-2-methyl-3-aminomethyl-5-methoxy indole hydrochloride

A solution of 350 mg. of 1-p-chlorobenzoyl-2-methyl-3-iminomethyl-5-methoxy indole and 100 mg. of 5% palladium on alumina in 25 ml. of methanol is reduced in an atmosphere of hydrogen until 1.0 mole of hydrogen is absorbed. The solution is then filtered and the filtrate is treated with one equivalent of hydrogen chloride in methanol and concentrated in vacuo to dryness. The residue is then dissolved in a minimum amount of ethanol, and ether is slowly added to precipitate the desired product.

When the 1-acyl-2-methyl-3-N-ethyliminomethyl-5-methoxy indoles, 1-p-chlorobenzoyl-3-N-ethyliminomethyl indoles, 1-p-chlorobenzoyl - 3 - N - ethyliminosubstitutedmethyl indoles, and 1-p-chlorobenzoyl-3-N-substitutediminomethyl indoles obtained from Example 9 are used in place of 1-p-chlorobenzoyl-2-methyl-3-iminomethyl-5-methoxy indole in the above example, there are obtained the hydrochlorides of the corresponding 1-acyl-2-methyl-3-N-ethylaminomethyl-5-methoxy indoles, 1-p-chlorobenzoyl-3-N-ethylaminomethyl indoles, 1-p-chlorobenzoyl-3-N-ethylaminosubstitutedmethyl indoles, and 1-p-chlorobenzoyl-3-N-substitutedaminomethyl indoles respectively.

(Those compounds which contain groups which will be affected by the above reduction are either eliminated or allowed to be reduced if that is the ultimate group desired.)

EXAMPLE 34

1 - p - chlorobenzoyl-2-methyl-3-N,N-diethylaminomethyl-5-methoxy indole

A mixture of 0.01 mole of 1-p-chlorobenzoyl-2-methyl-3-aminomethyl-5-methoxy indole hydrochloride, 0.022 mole of ethyl iodide, and 0.025 mole of sodium bicarbonate in 100 ml. of anhydrous 1,2-dimethoxyethane is stirred at room temperature under nitrogen for 8 hours. The mixture is then filtered and the solvent removed in vacuo. The residue thus obtained is chromatographed on 150 grams of a neutral alumina column and eluted with ether-petroleum ether (v./v. 20–100%) to obtain 1-p-chlorobenzoyl-2-methyl-3-N,N-diethylaminomethyl-5-methoxy indole.

Similarly, when 3-bromopropanol, methoxybenzyl chloride, benzyloxyethyl bromide, allyl bromide, methoxypropyl bromide, p-methoxyphenylpropyl iodide, cyclopropyl-methyl bromide, cyclobutylmethyl bromide, tetrahydrofurfuryl bromide, and cyclohexyl chloride are used in place of ethyl iodide in the above example, there are obtained the corresponding 1-p-chlorobenzoyl-2-methyl-3-N-substituted ethylaminomethyl-5-methoxy indoles.

Similarly, when the 1-acetyl-2-methyl-3-N-ethylaminomethyl - 5-methoxy indoles, 1-p-chlorobenzoyl-3-N-ethylaminomethyl indoles, 1-p-chlorobenzoyl-3-N-ethylaminosubstitutedmethyl indoles, and 1-p-chlorobenzoyl-3-N-substitutedaminomethyl indoles obtained from Example 33 are used in place of 1-p-chlorobenzoyl-2-methyl-3-aminomethyl-5-methoxy indole in the above example, there are obtained the corresponding 1-acyl-2-methyl-3-N,N-diethylaminomethyl-5-methoxy indoles, 1-p-chlorobenzoyl-3-N,N-diethylaminomethyl indoles, 1-p-chlorobenzoyl-3-N,N-diethylaminosubstitutedmethyl indoles, and 1-p-chlorobenzyl-3-N-substituted-N-ethylaminomethyl indoles respectively.

EXAMPLE 35

1-p-chlorobenzoyl-2-methyl-3-(2'methyl-2-'aminoethyl)-5-methoxy indole

A solution of 0.045 mole of 1-p-chlorobenzoyl-2-methyl-3-(2'-methyl-2'-nitrovinyl)-5-methoxy indole in 130 ml. of tetrahydrofuran is added dropwise over 15 minutes to a solution, heated to 50° C., of 0.55 mole of lithium aluminum hydride in 200 ml. of tetrahydrofuran and the mixture stirred for an additional 10 hours at 50° C. The mixture is then treated with 10.0 ml. of methanol and 100 ml. of saturated aqueous sodium sulfate solution. The mixture is then filtered and the filtrate washed with (3× 50 ml.) of chloroform and the combined chloroform extract concentrated in vacuo to dryness. The residue is distributed between ether and aqueous tartaric acid solution. The acid solution is cooled with ice and then made alkaline with dilute aqueous sodium hydroxide. The solution is then quickly extracted with (3× 50 ml.) ether and the combined ether extracts dried over sodium sulfate. The thus obtained ether solution is concentrated in vacuo to yield 1-p-chlorobenzoyl-2-methyl-3-(2′methyl-2′-aminoethyl)-5-methoxy indole.

When the 1-acyl-2-methyl-3-(2′-methyl-2′-nitrovinyl-5-methoxy indoles, 1-p-chlorobenzoyl-3-(2′-methyl-2′-nitrovinyl) substituted indoles, 1-p-chlorobenzoyl-3-(1′-substituted-2′-methyl-2′-nitrovinyl) substituted indoles, and 1-p-chlorobenzoyl-2-methyl-3-(2′-substituted-2′-nitrovinyl)-5-methoxy indoles are used in place of 1-p-chlorobenzoyl-2-methyl-3-(2′-methyl-2′-nitrovinyl)-5-methoxy indole in the above example, there are obtained the corresponding 1 - acyl - 2 - methyl - 3 - (2′ - methyl - 2′ - aminoethyl)- 5 - methoxy indoles, 1 - p - chlorobenzoyl - 3 - (2′ - methyl - 2′ - aminoethyl) substituted indoles, 1 - p - chlorobenzoyl - 3 - (1′ - substituted - 2′ - methyl - 2′ - aminoethyl) substituted indoles, and 1 - p - chlorobenzoyl - 2 - methyl - 3 - (2′ - substituted - 2′ - aminoethyl) - 5 - methoxy indoles respectively.

(Those compounds which contain groups which will be affected by the above reduction are either not used or reduced so as to obtain the group desired.)

EXAMPLE 36

1-p-chlorobenzoyl-2-methyl-5-methoxy-3-indolyl-α-ethyl-β-methyl aminoethane hydrochloride A solution of 360 mg. of 1-p-chlorobenzoyl-2-methyl-5-methoxy-3-indolyl-α-ethyl-β-methyl iminoethane and 100 mg. of 5% palladium on charcoal in 30 ml. of methanol is reduced in an atmosphere of hydrogen at room temperature until 1.0 mole of hydrogen is absorbed. The solution is filtered and the filtrate is treated with one equivalent of hydrogen chloride in methanol and evaporated to dryness. The residue is dissolved in a minimum amount of ethanol and the desired product is precipitated by the slow addition of ether.

When the 1-acyl-2-methyl-5-methoxy-3-indolyl-α-ethyl-β-methyl-N-ethyl iminoethanes and 1-p-chlorobenzoyl-substituted-3-indolyl-α,β-disubstituted-N-substituted iminoethanes obtained from Example 17 are used in place of 1 - p - chlorobenzoyl - 2 -methyl-5-methoxy-3-indolyl-α-ethyl-β-methyl iminoethane in the above example, there are obtained the corresponding 1-acyl-2-methyl-5-methoxy - 3 - indolyl - α - ethyl - β - methyl - N - ethyl aminoethanes and 1 - p - chlorobenzoyl - substituted - 3 - indolyl-α,β-disubstituted-N-substituted aminoethanes respectively.

(Those compounds which contain groups which will be affected by the above reduction are either not used or reduced to obtain the desired group.)

EXAMPLE 37

1-p-chlorobenzoyl-2-methyl-5-methoxy-3-indolyl-α-ethyl-β-methyl-N-ethyl aminoethane A mixture of 0.01 mole of 1-p-chlorobenzoyl-2-methyl-5-methoxy-3-indolyl-α-ethyl-β-methyl aminoethane hydrochloride, 0.011 mole of ethyl iodide, and 0.025 mole of sodium bicarbonate in 50 ml. of anhydrous 1,2-dimethoxyethane is stirred at room temperature under nitrogen for 8 hours. The mixture is then filtered and the solvent removed in vacuo. The residue thus obtained is chromatographed on 250 grams of a neutral alumina column and eluted with ether-petroleum ether (v./v. 20–100%) to obtain 1-p-chlorobenzoyl-2-methyl - 5-methoxy-3-indolyl-α-ethyl-β-methyl-N-ethyl aminoethane.

When the 1-acyl-2-methyl-5-methoxy-3-indolyl-α-ethyl-β - methyl - N-ethyl aminoethanes and the 1-p-chlorobenzoyl-substituted-3-indolyl - α, β-disubstituted-N-substituted aminoethanes obtained from Example 36 are used in place of 1-p-chlorobenzoyl-2-methyl-5-methoxy-3-indolyl-α-ethyl-β-methyl aminoethane hydrochloride in the above example, there are obtained the corresponding 1-acyl-2-methyl - 5 - methoxy - 3 - indolyl - α - ethyl - β - methyl-N,N - diethyl aminoethanes and 1 - p - chlorobenzoyl-substituted - 3 - indolyl - α,β - disubstituted - N - substituted-N-ethyl aminoethanes respectively.

Similarly, when methoxybenzyl chloride, benzyloxyethyl chloride, methoxypropyl bromide, p-methoxyphenylpropyl chloride, cyclopropylmethyl chloride, cyclobutylmethyl chloride, tetrahydrofurfuryl bromide, cyclohexyl bromide, 1,5-dibromopentane, dichlorodiethyl ether, di-(β-chloroethyl)-methylamine hydrochloride, di-(β-chloroethyl)-amine hydrochloride, di-(β-chloroethyl)-aniline hydrochloride, 1,4-dibromobutane, and di-(β-chloroethyl)-β-hydroxyethylamine hydrochloride are used in place of ethyl iodide in the above example, there are obtained the corresponding 1-p-chlorobenzoyl-2-methyl-5-methoxy-3-indolyl-α-ethyl-β-methyl-N-substituted aminoethanes and 1 - p - chlorobenzoyl - 2 - methyl - 5 - methoxy - 3 - indolyl - α - ethyl - β - methyl - N,N - cyclic aminoethanes respectively.

(When primary amino compounds in the above example are used, mixtures of secondary and tertiary amino compounds are formed.)

EXAMPLE 38

1-p-chlorobenzoyl-2-methyl - 5-methoxy-3-indolyl-α-ethyl-β-methyl propylamine hydrochloride To a solution of 0.02 mole of 1-p-chlorobenzoyl-2-methyl-5-methoxy-3-indolyl-α-ethyl-β-methyl ethylcyanide in 200 ml. of ethanol containing 0.02 mole of hydrogen chloride is added 0.1 gram of platinum oxide and the solution reduced at room temperature under an atmosphere of hydrogen. The reduced solution is then filtered and the filtrate evaporated to dryness to yield crude 1-p-chlorobenzoyl-2-methyl - 5-methoxy-3-indolyl-α-ethyl-β-methyl propylamine hydrochloride.

When the 1-acyl-2-methyl-5-methoxy-3-indolyl-α-ethyl-β-methyl ethylcyanides, 1-p-chlorobenzoyl-substituted-3-indolyl-α-ethyl-β-substituted ethylcyanides, and 1-p-chlorobenzoyl - 2 - methyl-5 - methoxy-3-indolyl-α-substituted-β-methyl ethylcyanides obtained from Example 24 are used in place of 1-p-chlorobenzoyl-2-methyl-5-methoxy-3-indolyl-α-ethyl-β-methyl ethylcyanide in the above example, there are obtained the hydrochlorides of the corresponding 1-acyl-2-methyl-5-methoxy-3-indolyl-α-ethyl-β-methyl propylamines, 1-p-chlorobenzoyl-substituted-3-indolyl-α-ethyl-β-substituted propylamines, and 1-p-chlorobenzoyl-2-methyl-5-methoxy-3-indolyl-α-substituted-β-methyl propylamines respectively.

(Those compounds which contain groups that will be affected by the above reduction are either not used or reduced so as to obtain the desired group.)

EXAMPLE 39

N-ethyl-1-p-chlorobenzoyl-2-methyl-5-methoxy-3-indolyl-α-ethyl-β-methyl propylamine A mixture of 0.01 mole of 1-p-chlorobenzoyl-2-methyl-5 - methoxy - 3 - indolyl - α-ethyl - β-methyl propylamine, 0.011 mole of ethyl iodide, and 0.015 mole of sodium bicarbonate in 50 ml. of anhydrous, 1,2-dimethoxyethane is heated on a steam bath under nitrogen for 3 hours. The mixture is then filtered and the solvent removed in vacuo. The residue thus obtained is chromatographed on 150 grams of a neutral alumina column and eluted with ether-petroleum ether (v./v. 20–100%) to obtain N-ethyl-1 - p - chlorobenzoyl - 2 - methyl - 5 - methoxy - 3 - indolyl-α-ethyl-β-methyl propylamine.

When the 1-acyl-2-methyl-5-methoxy-3-indolyl-α-ethyl-β - methyl propylamines, 1-p-chlorobenzoyl-ubstituted-3-indolyl-α-ethyl-β-substituted propylamines, and 1-p-chlorobenzoyl - 2 - methyl-5-methoxy-3-indolyl-α-substituted-β- methyl propylamines obtained from Example 38 are used in place of 1 - p - chlorobenzoyl - 2 - methyl - 5 - methoxy-3 - indolyl - α - ethyl - β - methyl propylamine in the above example, there are obtained the corresponding N-ethyl-1-acyl-2-methyl - 5 - methoxy-3-indolyl-α-ethyl-β-methyl propylamines, N-ethyl-1-p-chlorobenzoyl-substituted-3-indolyl-α-ethyl-β-substituted propylamines, and N-ethyl-1-p-chlorobenzoyl-2-methyl -5-methoxy-3-indolyl-α-substituted-β-methyl propylamines respectively.

Similarly, when methoxybenzyl chloride, benzyloxyethyl chloride, methoxypropyl bromide, p-methoxyphenylpropyl chloride, cyclopropylmethyl chloride, cyclobutylmethyl chloride, tetrahydrofurfuryl bromide, cyclohexyl bromide, 1,5-dibromopentane, dichlorodiethyl ether, di-(β-chloroethyl)-methylamine hydrochloride, di-(β-chloroethyl)-amine hydrochloride, di-(β-chloroethyl)-aniline hydrochloride, 1,4-dibromobutane, and di(β-chloroethyl)-β-hydroxyethylamine hydrochloride are used in place of ethyl iodide in the above example, there are obtained the corresponding 1-p-chlorobenzoyl-2-methyl-5-methoxy-3-indolyl-α-ethyl-β-methyl-N-substituted propylamines and 1-p-chlorobenzoyl-2-methyl - 5-methoxy-3-indolyl-α-ethyl-β-methylpropyl-N,N-cyclicamines respectively.

(When the primary amino compounds are used, a mixture of secondary and tertiary amino compounds are obtained.)

EXAMPLE 40

1-p-chlorobenzoyl-2-methyl-5-methoxy-3-indolyl-α-ethyl-β-methyl propylamine hydrochloride A solution of 0.045 mole of 1-p-chlorobenzoyl-2-methyl - 5 - methoxy - 3 - indolyl - α - ethyl - β - methyl-nitro-prop-1-ene in 130 ml. of glacial acetic acid is reduced catalytically at room temperature in the presence of platinum oxide and under 40 p.s.i. hydrogen. The solution is filtered, concentrated in vacuo to ca. 30 ml., and treated with 15 ml. of 3 N anhydrous hydrogen chloride in acetic acid. The mixture is diluted with 200 ml. of ether, and the precipitate is triturated with a small amount of ethanol to yield 1-p-chlorobenzoyl-2-methyl-5-methoxy-3-indolyl-α-ethyl-β-methyl propylamine hydrochloride.

When the 1-acyl-2-methyl-5-methoxy-3-indolyl-α-ethyl-β - methyl - nitro - prop - 1 - enes, 1 - p - chlorobenzoyl-substituted - 3 - indolyl - α - ethyl - β - substituted - nitro-prop-1-enes, and 1-p-chlorobenzoyl-2-methyl-5-methoxy-3 - indolyl - α - substituted - β - methyl - nitro - prop - 1-enes obtained from Example 29 are used in place of 1-p-chlorobenzoyl - 2 - methyl - 5 - methoxy - 3 - indolyl-α-ethyl-β-methyl-nitro-prop-1-ene in the above example, there are obtained the hydrochlorides of the corresponding 1 - acyl - 2 - methyl - 5 - methoxy - 3 - indolyl - α-ethyl-β-methyl propylamines, 1-p-chlorobenzoyl-substituted-3-indolyl-α-ethyl-β-substituted propylamines, and 1-p-chlorobenzoyl - 2 - methyl - 5 - methoxy - 3 - indolyl - α-substituted-β-methyl propylamines respectively.

(Those compounds which contain groups that will be affected by the above reduction are either not used or reduced so as to obtain the desired group.)

EXAMPLE 41

N-ethyl-1-p-chlorobenzoyl-2-methyl-5-methoxy-3-indolyl-α-ethyl-β-methyl propylamine A mixture of 0.01 mole of 1-p-chlorobenzoyl-2-methyl-5-methoxy-3-indolyl-α-ethyl-β-methyl propylamine, 0.011 mole of ethyl iodide, and 0.015 mole of sodium bicarbonate in 50 ml. of anhydrous 1,2-dimethoxyethane is heated on a steam bath under nitrogen for 3 hours. The mixture is then filtered and the solvent removed in vacuo. The residue thus obtained is chromatographed on 150 grams of a neutral alumina column and eluted with ether-petroleum ether (v./v. 20–100%) to obtain N-ethyl-1-p-chlorobenzoyl - 2 - methyl - 5 - methoxy - 3 - indolyl - α - ethyl - β-methyl propylamine.

When the 1-acyl-2-methyl-5-methoxy-3-indolyl-α-ethyl-β-methyl propylamines, 1-p-chlorobenzoyl-substituted-3-indolyl-α-ethyl-β-substituted propylamines, and 1-p-chlorobenzoyl - 2- -methyl - 5 - methoxy - 3 - indolyl - α-substituted-β-methyl propylamines obtained from Example 40 are used in place of 1-p-chlorobenzoyl-2-methyl-5-methoxy-3-indolyl-α-ethyl-β-methyl propylamine in the above example, there are obtained the corresponding N-ethyl - 1 - acyl - 2 - methyl - 5 - methoxy - 3 - indolyl - α-ethyl - β - methyl propylamines, N - ethyl - 1 - p - chlorobenzoyl - substituted - 3 - indolyl - α - ethyl - β - substituted propylamines, and N-ethyl-1-p-chlorobenzoyl-2-methyl-5-methoxy - 3 - indolyl - α - substituted - β - methyl propylamines respectively.

Similarly, when methoxybenzyl chloride, benzyloxyethyl chloride, methoxypropyl bromide, p-methoxyphenylpropyl chloride, cyclopropylmethyl chloride, cyclobutylmethyl chloride, tetrahydrofurfuryl bromide, cyclohexyl bromide, 1,5-dibromopentane, dichlorodiethyl ether, di-(β-chloroethyl)-methylamine hydrochloride, di-(β-chloroethyl)-amine hydrochloride, di-(β-chloroethyl)-aniline hydrochloride, 1,4-dibromobutane, and di-(β-chloroethyl)-β-hydroxyethylamine hydrochloride are used in place of ethyl iodide in the above example, there are obtained the corresponding N-substituted-1-p-chlorobenzoyl-2-methyl-5-methoxy-3-indolyl-α-ethyl-β-methyl propylamines and 1 - p - chlorobenzoyl - 2 - methyl - 5 - methoxy - 3 - indolyl-α-ethyl-β-methyl propylcyclicamines respectively.

(When primary amino compounds are used, a mixture of the secondary and tertiary amino compounds is obtained.)

EXAMPLE 42

1-p-chlorobenzoyl-2-methyl-5-methoxy-3-indolyl-α-ethyl β-methyl benzylideneaminoethane A solution of 0.021 mole of 2-methyl-5-methoxy-3-indolyl-α-ethyl-β-methyl benzylideneaminoethane in 20 ml. of dimethylformamide is added dropwise to a cold suspension of 1.0 gram (0.22 mole) of sodium hydride (52% dispersion in mineral oil) and 25 ml. of dimethylformamide. The mixture is stirred at room temperature for 20 minutes, cooled, and treated with (0.0222 mole) p-chlorobenzoyl chloride. The reaction mixture is stirred at room temperature for about 16 hours and poured into 260 ml. of ice water. The aqueous mixture is extracted with three 250 ml. portions of ether. The ether extract is washed with 100 ml. of potassium bicarbonate solution and three 100 ml. portions of water. The ether layer is dried and concentrated at reduced pressure to give 1-p-chlorobenzoyl - 2 - methyl - 5 - methoxy - 3 - indolyl - α-ethyl-β-methyl benzylideneaminoethane.

When the acylating agents obtained from Example 2 are used in place of p-chlorobenzoyl chloride in the above example, there are obtained the corresponding 1-acyl-2-methyl-5-methoxy-3-indolyl-α-ethyl-β-methyl benzylideneaminoethanes.

Similarly, when the substituted 3-indolyl-α-ethyl-β-substituted benzylideneaminoethanes and 2-methyl-5-methoxy-3-indolyl-α-substituted - β - methyl benzylideneaminoethanes obtained from Example 22 and the substituted-3-indolyl-α-ethyl-β-substituted-N,N - disubstituted aminoethanes and 2-methyl-5-methoxy-3-indolyl-α-substituted-β-methyl-N,N-disubstituted aminoethanes obtained from Example 23 are used in place of 2-methyl-5-methoxy-3-indolyl-α-ethyl-β-methyl benzylideneaminoethane in the above example, there are obtained the corresponding 1-p-chlorobenzoyl-substituted-3 - indolyl-α-ethyl-β-substituted benzylideneaminoethanes, 1-p-chlorobenzoyl-2-methyl-5-methoxy-3-indolyl-α - substituted - β - methyl benzylideneaminoethanes, 1-p-chlorobenzoyl-substituted-3-indolyl-α-ethyl-β-substituted-N,N-disubstituted aminoethanes, and 1-p-chlorobenzoyl-2-methyl - 5 - methoxy-3-indolyl-α-substituted-β-methyl-N,N-disubstituted aminoethanes respectively.

(Those compounds which contain groups that are affected by the above acylation are not used.)

EXAMPLE 43

1-p-chlorobenzoyl-2-methyl-5-methoxy-3-indolyl-α-ethyl-β-methyl ethylamine hydrochloride To a solution of 0.01 mole of 1-p-chlorobenzoyl-2-methyl-5-methoxy-3-indolyl-α-ethyl-β-methyl benzylideneaminoethane in 100 ml. of dioxan is added 0.01 mole of hydrochloric acid in 5 ml. of water. The reaction mixture is stirred for ½ hour at room temperature. The solution is then concentrated in vacuo, diluted with 30 ml. water, and extracted with (2× 50 ml.) ether. The aqueous layer is treated with activated charcoal and concentrated in vacuo to yield crude 1-p-chlorobenzoyl-2-methyl-5-methoxy-3-indolyl-α-ethyl-β-methyl ethylamine hydrochloride. The amine hydrochloride is recrystallized from ethanol.

When the 1-acyl-2-methyl-5-methoxy-3-indolyl-α-ethyl-β-methyl benzylideneaminoethanes, 1-p-chlorobenzoyl-substituted-3-indolyl-α-ethyl-β-substituted benzylideneaminoethanes, and 1-p-chlorobenzoyl-2-methyl-5-methoxy-3-indolyl-α-substituted-β-methyl benzylideneaminoethanes obtained from Example 42 are used in place of the 1-p-chlorobenzoyl-2-methyl-5-methoxy-3-indolyl-α-ethyl-β-methyl benzylideneaminoethane in the above example, there are obtained the hydrochlorides of the corresponding 1-acyl-2-methyl-5-methoxy-3-indolyl-α-ethyl-β-methyl ethylamines, 1-p-chlorobenzoyl-substituted-3-indolyl-α-ethyl-β-substituted ethylamines and 1-p-chlorobenzoyl-2-methyl-5-methoxy-3-indolyl-α-substituted-β-methyl ethylamines respectively.

EXAMPLE 44

N-ethyl-1-p-chlorobenzoyl-2-methyl-5-methoxy-3-indolyl-α-ethyl-β-methyl propylamine hydrochloride 0.1 gram of 5% palladium on alumina is added to a solution of 0.01 mole of N-ethyl-1-p-chlorobenzoyl-2-methyl-5-methoxy-3-indolyl-α-ethyl-β-methyl propylimine and 0.01 mole of hydrogen chloride in 200 ml. of methanol and the solution reduced at room temperature under an atmosphere of hydrogen. The solution is then filtered and the filtrate evaporated to dryness to yield crude N-ethyl-1-p-chlorobenzoyl-2-methyl-5-methoxy-3-indolyl-α-ethyl-β-methyl propylamine hydrochloride.

When the N-ethyl-1-acyl-2-methyl-5-methoxy-3-indolyl-α-ethyl-β-methyl propylimines, N-ethyl-1-p-chlorobenzoyl-substituted-3-indolyl-α-ethyl-β-substituted propylimines, and N-ethyl-1-p-chlorobenzoyl-2-methyl-5-methoxy-3-indolyl-α-substituted-β-methyl propylimines obtained from Example 27 are used in place of N-ethyl-1-p-chlorobenzoyl-2-methyl-5-methoxy-3-indolyl-α-ethyl-β-methyl propylimine in the above example, there are obtained the hydrochlorides of the corresponding N-ethyl-1-acyl-2-methyl-5-methoxy-3-indolyl-α-ethyl-β-methyl propylamines, N-ethyl-1-p-chlorobenzoyl-substituted-3-indolyl-α-ethyl-β-substituted propylamines, and N-ethyl-1-p-chlorobenzoyl-2-methyl-5-methoxy-3-indolyl-α-substituted-β-methyl propylamines respectively.

(Those compounds which contain groups that will be affected by the above reduction are not used unless it is desired to obtain those groups which are obtainable upon reduction.)

EXAMPLE 45

N,N-diethyl-1-p-chlorobenzoyl-2-methyl-5-methoxy-3-indolyl-α-ethyl-β-methyl propylamine A mixture of 0.01 mole of N-ethyl-1-p-chlorobenzoyl-2-methyl-5-methoxy-3-indolyl-α-ethyl-β-methyl propylamine, 0.011 mole of ethyl iodide, and 0.015 mole of sodium bicarbonate in 50 ml. of anhydrous 1,2-dimethoxyethane is heated on a steam bath under nitrogen for 3 hours. The mixture is then filtered and the solvent removed in vacuo. The residue thus obtained is chromatographed on 150 grams of a neutral alumina column and eluted with ether-petroleum ether (v./v. 20–100%) to obtain N,N-diethyl-1-p-chlorobenzoyl-2-methyl-5-methoxy-3-indolyl-α-ethyl-β-methyl propylamine.

When 1-iodo-3-chloropropane, 3-benzyloxypropyl bromide, 3-bromopropanol, allyl bromide, 1-bromide-prop-3-yne, 3-methoxypropyl bromide, cyclopropylmethyl bromide, cyclobutylmethyl bromide, 1,5-diiodopentane, dibromodiethyl ether, di-(β-chloroethyl)-methylamine hydrochloride, di-(β-chloroethyl)-amine hydrochloride, di-(β-chloroethyl)-aniline hydrochloride, 1,4-dichlorobutane, and di-(β-chloroethyl)-β-hydroxyethylamine hydrochloride are used in place of the ethyl iodide in the above example, there are obtained the corresponding N-substituted-N-ethyl-1-p-chlorobenzoyl-2-methyl-5-methoxy-3-indolyl-α-ethyl-β-methyl propylamines.

Similarly, when N-ethyl-1-acyl-2-methyl-5-methoxy-3-indolyl-α-ethyl-β-methyl propylamines, N-ethyl-1-p-chlorobenzoyl-substituted-3-indolyl-α-ethyl-β-substituted propylamines, and N-ethyl-1-p-chlorobenzoyl-2-methyl-5-methoxy-3-indolyl-α-substituted-β-methyl propylamines are used in place of N-ethyl-1-p-chlorobenzoyl-2-methyl-5-methoxy-3-indolyl-α-ethyl-β-methyl propylamine in the above example, there are obtained the corresponding N,N-diethyl-1-acyl-2-methyl-5-methoxy-3-indolyl-α-ethyl-β-methyl propylamines, N,N-diethyl-1-p-chlorobenzoyl-substituted-3-indolyl-α-ethyl-β-substituted propylamines, and N,N-diethyl-1-p-chlorobenzoyl-2-methyl-5-methoxy-3-indolyl-α-substituted-β-methyl propylamines respectively.

EXAMPLE 46

(N-1-p-chlorobenzoyl-2-methyl-5-methoxy-3-indolyl) acetamide

To a solution of 5.4 grams of (N-1-p-chlorobenzoyl-2-methyl-5-methoxy-3-indolyl) acetic acid and 1.8 ml. of triethylamine in 600 ml. of dimethoxyethane is added with ice cooling and stirring 2.24 grams of isobutyl chloroformate. After 20 minutes, the mixture is filtered and the filtrate treated with an excess of ammonia gas while the solution is cooled in an ice bath. The precipitate is collected, washed with (2× 25 ml.) dimethoxyethane followed by (2× 50 ml.) ether and dried in vacuo to yield 4.6 grams of the amide, M.P. 219–221° C.

Similarly, when (1-3,4,5-trimethoxybenzoyl-2-methyl-5-methoxy-3-indolyl) acetic acid,
(1-p-trifluoroacetylbenzoyl-2-methyl-5-methoxy-3-indolyl) acetic acid,
(1-p-N,N-dimethylsulfamylbenzoyl-2-methyl-5-methoxy-3-indolyl) acetic acid,
(1-p-difluoroacetylbenzoyl-2-methyl-5-methoxy-3-indolyl) acetic acid,
(1-p-carbomethoxybenzoyl-2-methyl-5-methoxy-3-indolyl) acetic acid,
(1-p-formylbenzoyl-2-methyl-5-methoxy-3-indolyl) acetic acid,
(1-p-trifluoromethylthiobenzoyl-2-methyl-5-methoxy-3-indolyl) acetic acid,
(1-N,N-dimethyl-p-sulfonamidobenzoyl-2-methyl-5-methoxy-3-indolyl) acetic acid,
(1-p-methylsulfinylbenzoyl-2-methyl-5-methoxy-3-indolyl) acetic acid,
(1-p-methylsulfonylbenzoyl-2-methyl-5-methoxy-3-indolyl) acetic acid,
(1-p-benzylthiobenzoyl-2-methyl-5-methoxy-3-indolyl) acetic acid,
(1-2-thenoyl-2-methyl-5-methoxy-3-indolyl) acetic acid,
(1-3-thenoyl-2-methyl-5-methoxy-3-indolyl) acetic acid,
(1-4-thiazole carbonyl-2-methyl-5-methoxy-3-indolyl) acetic acid,
(1-5-chloro-2-furoyl-2-methyl-5-methoxy-3-indolyl) acetic acid,
(1-5-methyl-4-oxazole carbonyl-2-methyl-5-methoxy-3-indolyl) acetic acid,
(1-nicotinoyl-2-methyl-5-methoxy-3-indolyl) acetic acid, (1-p-dimethylaminobenzoyl-2-methyl-5-methoxy-3-
  indolyl) acetic acid,
(1-p-acetaminobenzoyl-2-methyl-5-methoxy-3-indolyl)
  acetic acid,
(1-o-fluoro-p-chlorobenzoyl-2-methyl-5-methoxy-3-
  indolyl) acetic acid,
(1-o-methoxy-p-chlorobenzoyl-2-methyl-5-methoxy-3-
  indolyl) acetic acid,
(1-2,4,5-trichlorobenzoyl-2-methyl-5-methoxy-3-indolyl)
  acetic acid,
(1-p-chlorobenzoyl-2-methyl-4-methyl-5-methyl-3-in-
  dolyl) acetic acid,
(1-p-chlorobenzoyl-2-methyl-5-benzyloxy-3-indolyl)
  acetic acid,
(1-p-chlorobenzoyl-2-methyl-4-ethoxy-5-methoxy-3-in-
  dolyl) acetic acid,
(1-p-chlorobenzoyl-2-methyl-4-nitro-5-methoxy-3-in-
  dolyl) acetic acid,
(1-p-chlorobenzoyl-2-methyl-4-di(ethyl)amino-3-indolyl)
  acetic acid,
(1-p-chlorobenzoyl-2-methyl-4-acetamido-5-propoxy-3-
  indolyl) acetic acid,
(1-p-chlorobenzoyl-4-acetyl-5-methyl-3-indolyl) acetic
  acid,
(1-p-chlorobenzoyl-2-methyl-5-di(benzyloxypropyl)
  amino-3-indolyl) acetic acid,
(1-p-chlorobonzoyl-4-(1'-pyrrolidino)-5-methyl-3-
  indolyl) acetic acid,
(1-p-chlorobenzoyl-2-propyl-4-(4'-methyl-1'-piperazinyl)-
  3-indolyl) acetic acid,
(1-p-chlorobenzoyl-4-(4'-morpholinyl)-3-indolyl) acetic
  acid,
(1-p-chlorobenzoyl-2-methyl-4-cyano-5-methoxy-3-in-
  dolyl) acetic acid,
(1-p-chlorobenzoyl-2-methyl-4-trifluoromethyl-5-methoxy-
  3-indolyl) acetic acid,
(1-p-chlorobenzoyl-4-methyl-5-chloro-3-indolyl) acetic
  acid,
(1-p-chlorobenzoyl-2-methyl-4-dimethylsulfamyl-3-in-
  dolyl) acetic acid,
(1-p-chlorobenzoyl-2-methyl-4-benzylthio-5-methoxy-3-
  indolyl) acetic acid,
(1-p-chlorobenzoyl-2-methyl-5-benzyloxy-3-indolyl)
  acetic acid,
(1-p-chlorobenzoyl-2-methyl-5-p-ethylbenzyloxy-3-in-
  dolyl) acetic acid,
(1-p-chlorobenzoyl-2-methyl-4-p-bromobenzyloxy-5-
  methyl-3-indolyl) acetic acid,
(1-p-chlorobenzoyl-5-allyl-3-indolyl) acetic acid,
(1-p-chlorobenzoyl-2-methyl-4-(1'-azacyclopropyl)-3-
  indolyl) acetic acid,
(1-p-chlorobenzoyl-4-cyclopropylmethoxymethyloxy-3-
  indolyl) acetic acid,
(1-p-chlorobenzoyl-2-methyl-4-cyclobutylethoxymethyl-
  oxy-5-methyl-3-indolyl) acetic acid,
(1-p-chlorobenzoyl-2-methyl-4-dimethylsulfamyl-5-me-
  thoxy-3-indolyl) acetic acid,
(1-p-chlorobenzoyl-2-methyl-4,5-methylenedioxy-3-indo-
  lyl) acetic acid, and
(1-p-chlorobenzoyl-2-methyl-5,6-dichloro-3-indolyl)
  acetic acid
are used in place of (1-p-chlorobenzoyl-2-methyl-5-me-thoxy-3-indolyl) acetic acid in the above example, there are obtained the corresponding (N-1-acyl-2-methyl-5-me-thoxy-3-indolyl) acetamides and (1-p-chlorobenzoyl-sub-stituted-3-indolyl) acetamides.

EXAMPLE 47

(1-p-chlorobenzoyl-2-methyl-5-methoxy-3-indolyl)
acetonitrile

To a suspension of 3 grams of (1-p-chlorozenzoyl-2-methyl-5-methoxy-3-indolyl)acetamide in 30 ml. of pyridine in an ice-water bath while stirring is added a solution of 1.5 ml. of thionyl chloride in 3 ml. of ether. The mixture is stirred in an ice bath for 15 minutes followed by stirring at room temperature for an additional ½ hour. The mixture is then poured into an iced-water-ether suspension and the aqueous layer extracted with (3× 50 ml.) ether. The combined ether extracts are washed with (2× 25 ml.) water. The ether solution is then filtered and the ether filtrate dried over soduim sulfate. The ether is then concentrated in vacuo to obtain (1-p-chlorobenzoyl-2-methyl-5-methoxy-3-indolyl) acetonitrile.

Similarly, when the (N-1-acyl-2-methyl-5-methoxy-3-indolyl) acetamides and (1 - p-chlorobenzoly-indolyl) acetamides obtained from Example 46 are used in place of the (1-p-chlorobenzoyl-2-methyl-5-methoxyl-3-indolyl) acetamide in the above example, there are obtained the corresponding (N - 1-acyl-2-methyl-5-methoxy-3-indolyl) acetonitriles and (1-p-chlorobenzoyl-3-indolyl) acetonitriles respectively.

EXAMPLE 48

1-p-chlorobenzoyl-2-methyl-5-methoxyl-3-indolyl ethyla-
mine hydrochloride

To a solution of 0.02 mole of 1-p-chlorobenzoyl-2-methyl-5-methoxy-3-indolyl acetonitrile in 200 ml. of ethanol is added 0.1 gram of 10% palladium on charcoal and the solution reduced at room temperature under an atmosphere of hydrogen. The reduced solution is then filtered and the filtrate evaporated to dryness to yield crude 1 - p - chlorobenzoyl-2-methyl-5-methoxy-3-indolyl ethylamine hydrochloride.

Similarly, when using the N - 1 - acyl - 2 - methyl - 5-methoxy - 3 - indolyl acetonitriles and 1 - p - chlorobenzoyl-3-indolyl acetonitriles obtained from Example 47 in place of 1 - p - chlorobenzoyl - 2 - methyl - 5 - methoxy-3-indolyl acetonitrile in the above example, there are obtained the corresponding N - 1 - acyl - 2 - methyl - 5-methoxy - 3 - indolyl ethylamines and 1 - p - chlorobenzo-yl-3-indolyl ethylamines respectively.

EXAMPLE 49

N,N-diethyl-1-p-chlorobenzoyl-2-methyl-5-methoxy-3-
indolyl ethylamine

To a mixture of 0.01 mole of 1 - p - chlorobenzoyl - 2-methyl - 5 - methoxy-3-indolyl ethylamine hydrochloride, 0.022 mole of ethyl iodide and 0.025 mole of sodium bicarbonate in 50 ml. of anhydrous 1,2-dimethoxyethane is stirred at room temperature under nitrogen for 8 hours. The mixture is then filtered and the solvent removed in vacuo. The residue thus obtained is chromatographed in 150 grams of a neutral alumina column and eluted with ether-petroleum ether (v./v. 20–100%) to obtain N,N-diethyl - 1-p-chlorobenzoyl-2-methyl-5-methoxy-3-indolyl ethylamine.

When the N - 1 - acyl - 2-methyl-5-methoxy-3-indolyl ethylamines and 1-p-chlorobenzoyl-3-indolyl ethylamines obtained from Example 49 are used in place of the 1-p-chlorobenzoyl - 2-methyl-5-methoxy-3-indolyl ethylamine in the above example, there are obtained the corresponding N,N - diethyl - 1 - acyl-2-methyl-5-methoxy-3-indolyl ethylamines and N,N-diethyl-1-p-chlorobenzoyl-3-indolyl ethyiamines respectively.

Similarly, when 1-iodo-3-chloropropane, 3-benzyloxy-propyl bromide, 3-bromopropanol, allyl bromide, 1-bro-mide-prop-3-yne, 3-methoxypropyl bromide, cyclopropyl-methyl bromide, cyclobutylmethyl bromide, 1,5-diiodo-pentane, dibromodiethyl ether, di(β-chloroethyl)methyl-amine·HCl, di(α - chloroethyl)amine·HCl, di(β - chloro-ethyl)aniline·HCl, 1,4 - dichlorobutane, and di(β - chloro-ethyl)-β-hydroxyethylamine·HCl are used in place of the ethyl iodide in the above example, there are obtained the corresponding N - substituted - 1 - p - chlorobenzoyl-2-methyl - 5 - methoxy - 3 - indolyl ethylamines and N,N-di-substituted - 1 - p - chlorobenzoyl - 2 - methyl - 5-methoxy-3-indolyl ethylamines respectively.

EXAMPLE 50 p-Nitrophenyl-p-chlorobenzoate

To a solution of 13.9 grams of p-nitrophenol in 150 ml. dry dimethylformamide at 0° C. is added 5 grams of sodium hydride (50% emulsion in mineral oil) slowly and the mixture is allowed to stir for ½ hour. p-Chlorobenzoyl chloride (17.5 g.) is added dropwise over a period of ½ hour and the reaction mixture is stirred at 0° C. room temperature for 18 hours. The mixture is then poured into iced water containing a small amount of acetic acid and the product is extracted with ethyl acetate. The extract is washed with water twice, saturated sodium chloride once, and dried over sodium sulfate. Evaporation of the solvent gives 25 grams of crude product, which is recrystallized from chloroform, yielding 18.4 grams, M.P. 137° C.

EXAMPLE 51

β-(1-p-chlorobenzoyl-5-methoxy-2-methyl-3-indolyl)-N,N-dimethyl ethylamine

To a solution of 0.02 mole of N,N-dimethyl-5-methoxy-2-methyl-3-indolyl ethylamine in 60 ml. dry dimethylformamide under a nitrogen atmosphere is added 0.025 mole of sodium hydride (50% emulsion in mineral oil) with stirring and ice-cooling. After ½ hour a solution of 0.025 mole of p-nitrophenol-p-chlorobenzoate in 20 ml. dimethylformamide is added dropwise and the mixture is then stirred in the ice bath for 3 hours and at room temperature for 18 hours. The reaction mixture is poured into iced water and extracted with ether. The ethereal extract is washed with sodium carbonate, water, and dried over sodium sulfate. Evaporation of the solvent and chromatography of the residue oil on a column of 200 grams neutral alumina, using a mixture of ether-n-hexane as eluent gives the product.

Treatment of an ethereal solution of the free amine with anhydrous hydrogen chloride gives the amine hydrochloride salt.

EXAMPLE 52

1-p-fluorobenzoyl-3-(β-morpholinoethyl)-5-hydroxy indole hydrochloride

A solution of 0.01 mole 1-p-fluorobenzoyl-3-(β-morpholinoethyl)-5-benzyloxy indole in 60 ml. methanol is hydrogenated at room temperature in the presence of a 10% palladium on charcoal catalyst under 40 p.s.i. pressure. After 0.01 mole of hydrogen uptake, the reaction mixture is filtered, concentrated in vacuo, and redissolved in ether. The ether solution is treated with anhydrous hydrogen chloride to yield the hydrochloride of 1-p-fluorobenzoyl-3-(β-morpholinoethyl)-5-hydroxy indole hydrochloride.

We claim:
1. A compound of the formula:

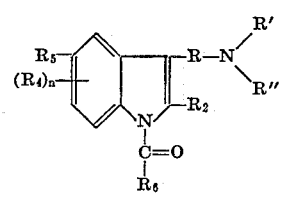

wherein:

R is selected from the group consisting of:

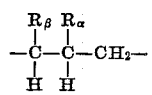

or

$R_\alpha$ and $R_\beta$ are selected from the group consisting of hydrogen, lower alkyl, hydroxy, lower alkoxy, and when taken together methylene;

R' and R'' are selected from the group consisting of hydrogen, lower alkyl, lower alkenyl, hydroxy, lower alkyl, β-phenethylacetyl and α-phenethyl;

$R_2$ is lower alkyl;

$R_4$ is selected from the group consisting of hydrogen, hydroxy, fluorine, lower alkoxy and lower alkenyl;

$R_5$ is selected from the group consisting of halogen, lower alkyl, lower alkoxy, hydroxy and lower alkenyl;

$R_6$ is substituted phenyl wherein the substituent is selected from the group consisting of halo, lower alkoxy, lower alkylthio, trifluoromethyl, dilower alkoxy, methylene dioxy or trilower alkoxy; and $n$ is a number from 1 to 3;

or the non-toxic acid addition salts.

2. A compound of the formula:

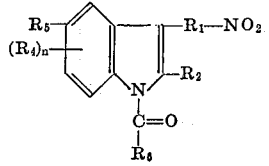

wherein:

$R_1$ is selected from the group consisting of

and

$R_\alpha$ and $R_\beta$ are selected from the group consisting of hydrogen, lower alkyl, halo lower alkyl, benzyloxy lower alkyl, hydroxy lower alkyl, lower alkenyl, lower alkynyl, and when taken together, methylene;

$R_2$ is selected from the group consisting of hydrogen, lower alkenyl, p-lower alkoxyphenyl and lower alkyl;

$R_4$ and $R_5$ are selected from the group consisting of hydrogen, hydroxy, lower alkoxy, lower alkyl, nitro, amino, lower alkylamino, di(lower alkyl) amino, lower alkanoylamino, lower alkanoyl, bis(hydroxy lower alkyl)amino, 1-pyrrolidino, 4-methyl-1-piperazinyl, 4-morpholinyl, cyano, trifluoromethyl, halogen, di(lower alkyl) sulfamyl, benzylthio, benzyloxy, lower alkylbenzyloxy, lower alkoxybenzyloxy, halogenobenzyloxy, lower alkenyl, lower alkenyloxy, 1-azacylopropyl, cyclopropyl(lower alkoxy) and when $R_4$ and $R_5$ are ortho to each other and taken together, lower alkylenedioxy;

$R_6$ is selected from the group consisting of benzene, furyl, thienyl, thiazolyl, pyridyl, oxazolyl, and substituted benzene, in which the substituents other than hydrogen are selected from the group consisting of halogen, lower alkyl, lower alkylthio, lower alkoxy, trifluoromethyl, trifluoroacetyl, difluoroacetyl, di (lower alkyl) sulfamyl, lower alkanoyl, carb-lower alkoxy, trifluoromethylthio, lower alkylsulfinyl, lower alkylsulfonyl, benzylthio, nitro, di(lower alkyl) amino, lower alkylamino and lower alkanoylamino and substituted furyl, thienyl, thiazolyl, pyridyl and oxazolyl in which the substituents other than hydrogen are selected from the group consisting of chloro and lower alkyl;

n is a number from 1 to 3;

and their non-toxic acid addition salts.

3. A compound of the formula:

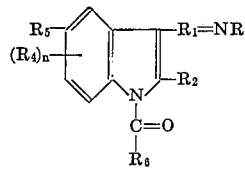

wherein:

R is selected from the group consisting of hydrogen, lower alkyl, halo lower alkyl, lower alkoxy lower alkyl, ar-lower alkoxy lower alkyl, hydroxy lower alkyl, lower alkenyl, lower alkynyl, cyclopropylmethyl, cyclobutylmethyl, tetrahydrofurfuryl and cyclohexyl;

$R_1$ is selected from the group consisting of

and

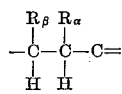

$R_\alpha$ and $R_\beta$ are selected from the group consisting of hydrogen, lower alkyl, halo lower alkyl, benzyloxy lower alkyl, hydroxy lower alkyl, lower alkenyl, lower alkynyl, and when taken together, methylene;

$R_2$ is selected from the group consisting of hydrogen, lower alkenyl, p-lower alkoxyphenyl and lower alkyl;

$R_4$ and $R_5$ are selected from the group consisting of hydrogen, hydroxy, lower alkyl, lower alkoxy, nitro, amino, lower alkylamino, di(lower alkyl) amino, lower alkanoylamino, lower alkanoyl, bis(hydroxy lower alkyl) amino, 1-pyrrolidino, 4-methyl-1-piperazinyl, 4-morpholinyl, cyano, trifluoromethyl, halogen, di(lower alkyl) sulfamyl, benzylthio, benzyloxy, lower alkylbenzyloxy, lower alkoxybenzyloxy, halogenobenzyloxy, lower alkenyl, lower alkenyloxy, 1-azacyclopropyl, cyclopropyl(lower alkoxy) and cyclobutyl(lower alkoxy), and when $R_4$ and $R_5$ are ortho to each other and taken together lower alkylenedioxy;

$R_6$ is selected from the group consisting of benzene, furyl, thienyl, thiazolyl, pyridyl, oxazolyl and substituted benzene in which the substituents other than hydrogen are selected from the group consisting of halogen, lower alkyl, lower alkylthio, lower alkoxy, trifluoromethyl, trifluoroacetyl, difluoroacetyl, di (lower alkyl) sulfamyl, lower alkanoyl, carb-lower alkoxy, trifluoromethylthio, lower alkylsulfinyl, lower alkylsulfonyl, benzylthio, nitro, di(lower alkyl) amino, lower alkylamino and lower alkanoylamino; and substituted furyl, thienyl, thiazolyl, pyridyl and oxazolyl in which the substituents other than hydrogen are selected from the group consisting of chloro and lower alkyl;

n is a number from 1 to 3;

and their non-toxic acid addition salts.

4. 1 - p - chlorobenzoyl - 2 - methyl-3-aminoethyl-5-methoxy indole hydrochloride.

5. 1 - p - chlorobenzoyl - 2 - methyl-3-aminoethyl-5-dimethylamino indole hydrochloride.

6. 1 - p - trifluoromethylbenzoyl - 2 - methyl-3-(2'-methyl-2'-aminoethyl)-5-methoxy indole hydrochloride.

7. 1 - p - chlorobenzoyl - 3 - (2'-ethyl-2'-aminoethyl)-7-methyl indole hydrochloride.

8. 1 - benzoyl - 2 - methyl-3-aminoethyl-5-hydroxy indole hydrochloride.

References Cited

UNITED STATES PATENTS 3,183,235  5/1965  Zenitz.
3,072,530  1/1963  Hofmann et al.

FOREIGN PATENTS 615,395  9/1962  Belgium.
621,313  2/1963  Belgium.

OTHER REFERENCES

Chemical Abstracts Decennial Index, vols. 21–30 (1927–36), Subject Index E–O, pp. 5474–75.

ALEX MAZEL, Primary Examiner

J. A. NARCAVAGE, Assistant Examiner

U.S. Cl. X.R.

260—45.8, 247.1, 247.2, 247.5, 268, 293.4, 294, 294.3, 294.7, 294.8, 294.9, 295, 296, 302, 307, 319.1, 326.12, 326.13, 326.14, 326.15, 326.16; 424—59, 248, 250, 267, 270, 272, 274